United States Patent
Danzuka et al.

(10) Patent No.: US 6,234,600 B1
(45) Date of Patent: *May 22, 2001

(54) IMAGE RECORDING APPARATUS WHICH CAN PREVENT BLEEDING AT A BORDER OF A REGION TO BE RECORDED

(75) Inventors: Toshimitsu Danzuka, Tokyo; Akio Suzuki, Yokohama; Hisashi Fukushima; Yasushi Miura, both of Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/547,933

(22) Filed: Oct. 25, 1995

Related U.S. Application Data

(62) Division of application No. 07/942,935, filed on Sep. 10, 1992, now abandoned.

(30) Foreign Application Priority Data

| Sep. 11, 1991 | (JP) | 3-231786 |
| Oct. 9, 1991 | (JP) | 3-261908 |
| Sep. 3, 1992 | (JP) | 4-236078 |

(51) Int. Cl.[7] .................................. B41J 2/01
(52) U.S. Cl. .................. 347/15; 347/43; 358/298
(58) Field of Search ............... 347/15, 43, 131, 347/240, 251; 358/298, 1.9; 395/109

(56) References Cited

U.S. PATENT DOCUMENTS

| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,521,805 | 6/1985 | Ayata et al. | 358/501 |

(List continued on next page.)

FOREIGN PATENT DOCUMENTS

| 0150119 | 7/1985 | (EP) . |
| 54-56847 | 5/1979 | (JP) . |
| 58-1276 | 1/1983 | (JP) . |
| 58-65666 | 4/1983 | (JP) . |
| 59-123670 | 7/1984 | (JP) . |
| 59-138461 | 8/1984 | (JP) . |
| 60-71260 | 4/1985 | (JP) . |
| 1-55248 | 3/1989 | (JP) . |
| 2-219659 | 9/1990 | (JP) . |

*Primary Examiner*—John Barlow
*Assistant Examiner*—Craig A. Hallacher
(74) *Attorney, Agent, or Firm*—Fitzpatrick, Cella, Harper & Scinto

(57) ABSTRACT

An image recording apparatus using a plurality of recording heads that can prevent black lines from occurring at boundaries of each scanning of the recording heads. The total recorded ink volume at the boundaries is positively reduced so that the black lines and the overflow of ink are prevented. The apparatus includes at least a pair of a dark head for discharging relatively dark ink and a light head for discharging relatively light ink, and separates an input image signal into image signals applied to the dark and light heads using at least two tables. The two tables, one for edge nozzles of each recording head and the other for the remaining nozzles, separate the input image signal independently so that the total ink volume discharged from the edge nozzles are limited to a relatively small amount. Further, the total volume of inks discharged from the edge nozzles of the recording heads are positively reduced by performing black abstraction processing, UCR processing and black inking processing on the basis of the image signals after the separation by the tables, which image signals are linearly correspond to the ink volume.

14 Claims, 31 Drawing Sheets

U.S. PATENT DOCUMENTS

| | | | |
|---|---|---|---|
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 4,829,323 | 5/1989 | Suzuki et al. | 347/15 |
| 4,853,768 | 8/1989 | Suzuki et al. | 358/517 |
| 4,882,621 | 11/1989 | Suzuki et al. | 358/518 |
| 5,225,489 | 7/1993 | Prevorsek et al. | 525/151 |
| 5,252,992 * | 10/1993 | Fukushima et al. | 347/43 |
| 5,428,377 * | 6/1995 | Stoffel et al. | 347/15 |
| 5,633,662 * | 5/1997 | Allen et al. | 347/15 |

* cited by examiner

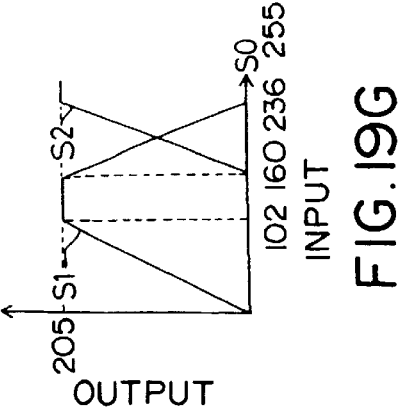
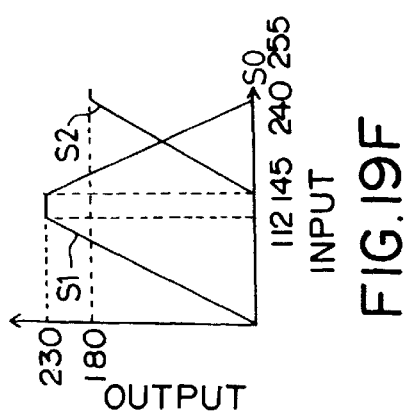
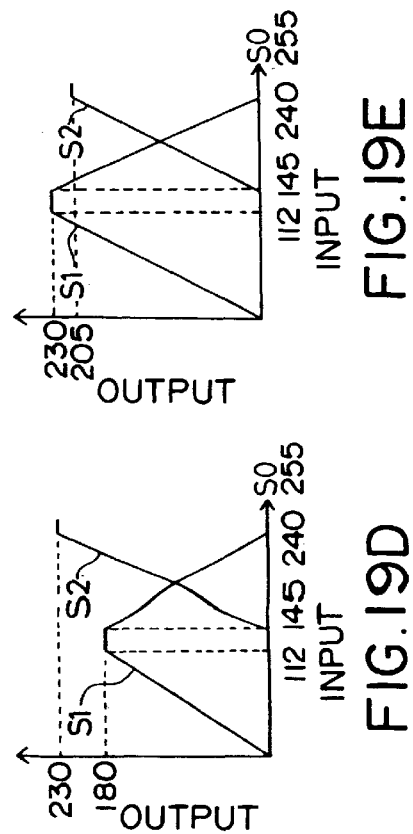
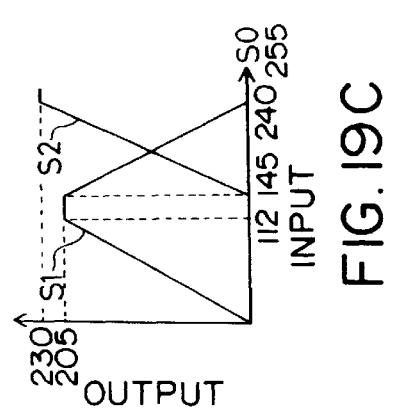
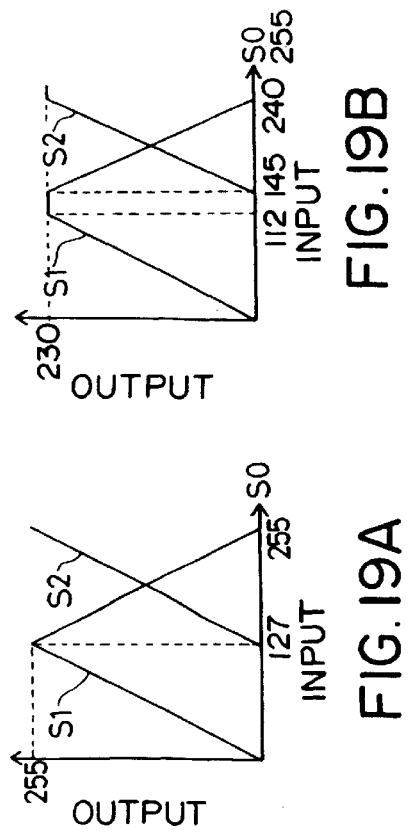
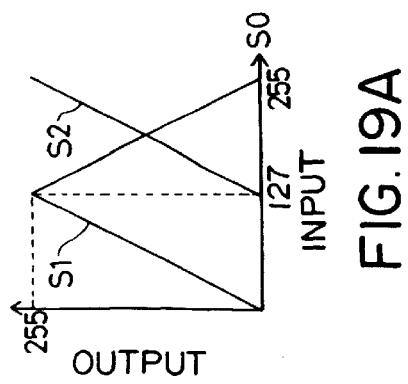

IMAGE RECORDING APPARATUS WHICH CAN PREVENT BLEEDING AT A BORDER OF A REGION TO BE RECORDED

This application is a division of application Ser. No. 07/942,935, filed Sep. 10, 1992 abandoned.

BACKGROUND OF THE INVENTION

1. Field of the Invention

The present invention relates to an image recording apparatus.

2. Description of the Related Art

An ink jet recording apparatus which performs printing (recording) by discharging ink onto a recording medium is known as one of the conventional image recording apparatuses.

Ink jet recording apparatus have been rapidly spread recently because they are non-impact type recording apparatus and producing little noise, and color image recording can be easily implemented by using multiple inks.

FIG. 1 is a schematic perspective view showing a conventional ink jet recording apparatus.

In FIG. 1, a recording medium 5 wound in a roll passes transport rollers 1 and 2, is held by paper incrementing rollers 3, and is incremented in the direction of f in FIG. 1 by the driving of a subscanning motor 4 coupled to one of the incrementing roller 3. Across the recording medium 5, guide rails 6 and 7 are disposed in parallel, and a carriage 8 is mounted thereon. The carriage 8 moves in the lateral direction so that a recording head unit 9 mounted thereon is scanned in that direction. On the carriage 8, four color recording heads 9Y, 9M, 9C and 9Bk for yellow, magenta, cyan and black are mounted, and four ink reservoirs corresponding to those colors are disposed. Each head includes a orifice array including a plurality of ink orifices, and orifice arrays of the heads are disposed in parallel. The recording medium 5 is intermittently incremented by the amount of recording of the head unit 9, and the head unit 9 is scanned in the direction P discharging ink droplets in accordance with a binary image signal while the recording medium is stationary.

With such an ink jet recording apparatus, the recording medium characteristics are very important. In particular, ink running characteristics on a recording medium have strong influence on image quality. As one of the indices representing the ink running characteristics of the recording medium, a "spreading rate" is known. It indicates how many times an ink droplet ejected from an ink jet nozzle will spread after arriving on a recording medium, and is given by the following equation:

spreading rate=dot diameter on the recording medium/ink droplet diameter ejected from the nozzle For example, if an ink droplet of 30 .mu.m diameter during traveling forms a dot of 90 .mu.m diameter on the recording medium, the spreading rate of the recording medium is 3.0. With recording media of small spreading rates, the image intensity is low, and hence, it is difficult to achieve smooth texture, high quality images.

On the other hand, although recording media of a high spreading ratio can increase the image intensity, the following problems arise.

A serial scanning type ink jet recording apparatus as shown in FIG. 1 sequentially records images of width d as indicated by (1), (2) and (3) in FIG. 2 by scanning in the direction A the recording head unit 9 including a plurality of ink discharge orifice arrays disposed in parallel. For example, when the number of orifices per array is 256, and the recording density is 400 dots/inch (dpi), the recording width d becomes 16.256 mm (=265.times.25.4/400).

When the volume of ink landing on the recording medium is small, the actual width of the recorded image is approximately equal to the recording width d because the ink is sufficiently absorbed by the recording medium. Accordingly, when recording is performed by repeating the scanning of the recording head unit 9 in the direction A and the subscanning of the head unit 9 by the amount of d in the direction B, joint portions between two adjacent images recorded by two continuous scannings present little problem as shown in FIG. 2.

The image width, however, may increase to d+.DELTA.d owing to ink running when recording high density portions where the volume of ink is great because the recording medium of a large spreading ratio cannot sufficiently absorb ink. In such a case, the subscanning of the head unit 9 by an amount of d will cause an overlap of images by the amount of .DELTA.d as shown in FIG. 2B, thereby resulting in black lines at the overlapped portions. In contrast with this, if the subscanning of the head unit 9 is set as the amount of d+.DELTA.d, white lines will appear at low density portions where the volume of ink is small.

The extra amount .DELTA.d of the image width at high density portions changes depending on the spreading rate of a recording medium, or the volume of ink arriving at the recording medium, and increases consistently with the spreading rate and the ink volume. For this reason, to prevent black lines from occurring, it is necessary to use a recording medium of a small spreading rate, or to reduce the ink volume. In this case, however, the image intensity decreases as stated before, which presents a problem in that smooth texture, high quality images cannot be obtained.

To solve such a problem, the applicants of the present invention proposed the U.S. Ser. No. 679,147. In this proposal, if values of an image signal at the boundaries of the serial scanning exceed a predetermined amount, they are reduced before being applied to recording elements involved in recording the boundaries. This makes it possible to reduce the ink volume discharged from nozzles associated with the recording elements, thereby preventing black lines from occurring at high density, boundary portions.

In this method, the image signal applied to the recording elements associated with the nozzles at the edges of the discharge orifice arrays is converted by a table, the function of which is shown in FIG. 3: if the input image signal to the table exceeds a predetermined value T, the output of the table fed to the recording elements is restricted at a fixed value F. Thus, in the case where the density of the image signal applied to the recording elements associated with edge nozzles is rather high, the volume of ink discharged from the edge nozzles is restricted, thereby circumventing the occurrence of black lines at the joint portions.

On the other hand, a recording apparatus has been proposed which includes a plurality of recording heads discharging inks of different concentration to improve the gradation of an image. For example, a color image recording apparatus has been proposed which uses several sets of inks, each set consisting of inks belonging to the same color family and having different concentrations, such as light black ink and dark black ink, light cyan ink and dark cyan ink, light magenta ink and dark magenta ink, and light yellow ink and dark yellow ink, thereby improving graininess at highlighted portions. Using this head unit makes it possible to ameliorate the problem in that dots appear unnaturally in highlighted portions in an image recorded by a binary recording type color image recording apparatus.

FIG. 4 shows the schematic arrangement of a conventional color ink jet recording apparatus of this type. This recording apparatus is different from the recording apparatus of FIG. 1 in the construction of the recording head unit 9. The recording head unit 9 comprises eight recording heads 9-1BK for light black, 9-2BK for dark black, 9-1C for light cyan, 9-2C for dark cyan, 9-1M for light magenta, 9-2M for dark magenta, 9-1Y for light yellow, and 9-2Y for dark yellow, and four sets of color ink reservoirs, each of which comprises two inks of the same color family with different concentrations. The recording medium 5 is intermittently incremented by the amount of a recording by the recording head unit 9, and the recording is carried out while the recording medium 5 is stationary. More specifically, the recording head unit 9 is scanned in the direction of the arrow P along the guide rails 6 and 7 discharging ink droplets in accordance with an image signal, thereby forming a color image consisting of dot matrices on the recording medium 5.

Generally, the signal processing system of the color image recording apparatus of this type is arranged as shown in FIG. 5. Since the signal processing system has a similar construction for each of the fur color families of black, cyan, magenta and yellow, the system for one color family is described. In FIG. 5, an input image signal S0 is divided in accordance with its intensity by a dark/light separating circuit 11. More specifically, the input image signal S0 is divided into a light black image signal S1 and a dark black image signal S2 by a dark/light separating table having input and output characteristics as illustrated in FIG. 6, and the image signals S1 and S2 are sent to a multiple-to-binary converter 12 which converts the multi-level image signals S1 and S2 into binary signals, and sends them to corresponding head drivers 13-1 and 13-2. The head drivers drive corresponding heads 9-1 and 9-2, thus recording an image. Here, the head driver 13-1 and the recording head 9-1 are for light ink, and the head driver 13-2 and the recording head 9-2 are for dark ink.

FIG. 6 illustrates the driving duty of the dark and light heads for the input image signal S0. When the input image signal S0 is smaller than P (P=127 for an 8-bit signal, for example), only the light head 9-1 is used. On the other hand, when the input image signal S0 is greater than P, the recording duty of the light head 9-1 is gradually reduced whereas the recording duty of the dark head 9-2 is gradually increased. For example, consider 2.times.2 superpixels including four dots each. One superpixel can be formed by discharging ink drops up to twice from two nozzles of the dark head and the corresponding two nozzles of the light head, the nozzles being arranged in the vertical direction of each head, for instance, let us assume that, at the first discharge, only light ink droplets are discharged from the two nozzles of the light head, and at the second discharge, a light ink droplet is discharged from the upper nozzle of the light head and a dark ink droplet is discharged from the lower nozzle of the dark head. Thus, the duty of the light head is 75% and that of the dark head is 25% in forming this superpixel.

By driving two recording heads in accordance with the image signal as described above, the concentration of images can be controlled as shown in FIG. 7. Although the recorded image density characteristics as shown in FIG. 7 can be achieved by using only the dark head 9-2, using both the dark and light heads is advantageous in that the rough feeling of dots at low density portions is reduced, and a smooth gradation image can be achieved.

However, the recording by using the dark and light heads cannot sometimes accomplish sufficient effects even if the image signal correction for the edge nozzles is performed as stated before. More specifically, when the image signal correction is carried out by using the dark/light separation table whose characteristics are shown in FIG. 6, the total ink volume (the sum of the light ink volume and the dark ink volume) discharged form the heads reaches the fixed maximum after the input image signal S0 exceeds the value P as shown in FIG. 8. In the region where the image signal S0 is greater than P, both the dark and light heads are used as shown in FIG. 6. In this case, the ink volume discharged from the light head decreases as the ink volume discharged from the dark head increases, and hence, the total discharged ink volume is maintained at the fixed value. Consequently, if the maximum total ink volume is discharged from the edge discharging nozzles of the dark and light recording heads, the problem of ink running and the black lines may occur. To avoid this, the total ink volume discharged from the edge nozzles must be restricted if the input image signal exceeds a predetermined value Q smaller than P.

To achieve this, a table conversion as shown in FIG. 9 must be performed on the image signal S0 inputted to the edge nozzles. Here, the value Q is determined experimentally by practically printing an image on a recording medium so as to obtain optimum conditions, and the value S in FIG. 9 corresponds to the level Q of the input image signal S0 as shown in FIGS. 6. This conversion, however, is sometimes ineffective to restrict the ink discharge volume for the following reason. As will be seen from FIG. 6, when the image signal S0 is greater than Q, the image signals S1 and S2 applied to the dark and light recording heads will exceed the value S in the regions A and C of FIG. 6, respectively. Accordingly, the image signals S1 and S2 are restricted as shown in FIG. 9 in the regions A and C. On the other hand, the image signals S1 and S2 do not exceed S in the region B of FIG. 6 even if the input image signal S0 is greater than P. Thus, the image signals S1 and S2 are not restricted in the region B. AS a result, the total ink volume is not restricted, and the black lines are likely to occur.

The characteristic lines of FIG. 6 will now be explained in more detail. When the image signal S0 takes a value from 0 to 127 in the 8-bit representation, only the image signal S1 applied to the recording head 9-1 for light ink is outputted. This means that the optical density is achieved by recording a number of light ink dots on the recording medium so that the degradation of an image due to distinct individual dots can be prevented.

On the other hand, when the image signal S0 ranges from 128 to 255 in the 8-bit representation, the value of the image signal S2 applied to the recording head 9-2 for the dark ink after the separation by the table increases linearly with the image signal S0, thus increasing the discharge volume of the dark ink. In contrast, the image signal S1 applied to the recording head 9-1 for the light ink decreases linearly with the image signal S0 so as to restrict the total ink discharge volume. If the discharge volume of the light ink is not decreased, the total ink discharge volume will exceed the allowable ink volume of a recording medium when a plurality of color inks are superimposed, thereby causing the overflow of the ink.

To avoid the overflow of ink, UCR (under color removal) processing and inking processing of black ink are carried out so that the total ink discharge volume is reduced. More specifically, at portions where cyan, magenta and yellow inks are superimposed to represent black, the volumes of these inks are reduced, and black ink is used in place of these inks, thus reducing the total ink discharge volume. The conventional method, however, employs the image signal S0 before the dark/light separation to perform the UCR and inking processings. This presents a problem in that the total ink volume cannot be effectively reduced for the following reasons. FIG. 10 illustrates the relationship between the input image signal S0 and the recorded ink volume Vink per color (the sum of light ink and dark ink) when the image signal S0 is separated by the table as shown in FIG. 6. As will be seen from FIG. 10, the recorded ink volume of each color is maintained at a fixed value even if the image signal S0 decreases in the range from 128 to 255 in the 8-bit representation. Thus, the reduction of the recorded ink volume cannot be expected by the UCR processing. As a result, there still remains a problem that the total recorded ink volume cannot be effectively reduced.

Moreover, when the three inks of cyan, magenta and yellow (that is, the light cyan and dark cyan, the light magenta and dark magenta, and the light yellow and dark yellow) are superimposed, the total ink volume may exceed the allowable ink volume of a common recording medium, thereby causing the overflow of inks on the recording medium, even if the image signal S1 is decreased as the image signal S0 increases in the range of 128–256 in the 8-bit representation.

SUMMARY OF THE INVENTION

In view of these problems, it is an object of the present invention to provide an image recording apparatus which can prevent black lines at the boundaries corresponding to the edge nozzles of the recording heads when recording is performed using a plurality of heads of different ink concentrations.

It is another object of the present invention to provide an image recording apparatus which can positively reduce the total ink volume so that the overflow of inks is prevented and a high quality image can be formed.

According to a first aspect of the present invention, there is provide an image recording apparatus which performs image recording by using a plurality of recording heads, each of the recording heads having a plurality of nozzles for discharging ink, and at least two of the recording heads discharging inks of different concentration of the same color family, the apparatus comprising:

separating means operating according to at least two types of tables for separating an image signal corresponding to the same color family, and for outputting separated image signals determining a driving duty of each of the recording heads associated with the same color family;

separation control means for switching the tables in the separating means in accordance with locations of nozzles in each of the recording heads; and head driving means for driving each of the recording heads in accordance with the head driving duty determined by the separating means.

Here, the driving duty may be the number of head driving operations per superpixel consisting of a predetermined number of dots.

The separating means may select one of the tables which reduces the ink discharge volumes at the edge nozzles to a smaller amount than that at the remaining nozzles if the image signals are larger than a predetermined value.

The separating means may select one of the tables on the basis of the image signals associated with a pixel to be recorded and its neighboring pixels.

The separating means may further comprise operation means for performing a weighted summation on image signals of respective colors, and may select one of the tables in accordance with the output of the operation means and the image signals.

The image recording apparatus may further comprise temperature detecting means for detecting the temperature of each of the recording heads, and the separating means may select one of the tables in accordance with the locations of the nozzles and the temperature detected by the temperature detecting means.

The plurality of recording heads may comprise recording heads for cyan, magenta, yellow and black.

Each of the recording heads may cause a state transition in ink by utilizing thermal energy, and discharges ink on the basis of the state transition.

According to a second aspect of the present invention, there is provided an image recording apparatus which performs image recording by using a recording head including a plurality of nozzles discharging black ink, the apparatus comprising:

scanning means for scanning the recording head;

driving means for driving the recording head so that the recording means discharges ink from the nozzles to form pixels on a recording medium, each of the pixels corresponding to one or more nozzles;

control means for generating from an input image signal a signal to be supplied to the driving means; and correction means for correcting the volume of the black ink projected to each edge pixel close to boundaries of a region formed by the scanning in accordance with the input image signal.

Here, the correction means may comprise means for generating a corrected input image signal by calculating a weighted summation of the input image signal associated with pixels in a matrix consisting of the edge pixel and its neighboring pixels, and correcting means for correcting the volume of black ink to be projected into each of the dye pixels in accordance with the corrected input image signal.

The correcting means may vary the coefficients of the weighted summation in accordance with the type of the recording medium.

The matrix may be a one dimensional matrix arranged in the direction of a nozzle array of the recording head.

The apparatus may comprise recording heads for black, cyan, magenta, yellow and black inks.

The control means may generate the signal supplied to the head driving means in such a manner that the signal associated with the black ink is outputted second or later in order in the plurality of colors of ink.

According to a third aspect of the present invention, there is provided an image processing apparatus comprising:

image signal input means for outputting a first image signal including at least three signals corresponding to cyan, magenta and yellow, respectively;

image signal converting means for converting at least one of the signals included in the first image signal into N (N is an integer greater than one) second image signals corresponding to N inks of different concentrations of the same color family;

black abstraction means for performing black abstraction independently of each of the second image signals to produce a third signal; and signal processing means for performing a UCR processing and black inking processing on the second and third signals to produce fourth signals.

The image signal converting means may convert at least one of the signals of the first signal into the second signal including at least two signals consisting of a light second signal and a dark second signal, the light second signal and dark second signal corresponding to two inks of different concentrations of the same color family.

The black abstraction means may produced a minimum value of the light second signal or signals as a light black third signal, and produces a minimum value of the dark signal or signals as a dark black third signal.

The signal processing means may form the fourth image signals other than the black family from each of the third image signals other than the black family by subtracting the corresponding light or dark black signal of the third signal from the corresponding third image signal, and forms the fourth image signals of the black family by multiplying each of the third image signals of the black family by a predetermined fixed value.

The image signal converting means may include three converters independently provided for each of three colors of cyan, magenta and yellow, the converters converting image signals associated with cyan, magenta and yellow included in the first image signal into the second image signals associated with light cyan, dark cyan, light magenta, dark magenta, light yellow and dark yellow.

The image signal converting means may include two converters independently provided for each of two colors of cyan and magenta, the converters converting image signals associated with cyan and magenta included in the first image signal into the second image signals associated with light cyan, dark cyan, light magenta, and dark magenta.

The black abstraction means may form the third image signal including image signals associated with light cyan, dark cyan, light magenta, dark magenta, yellow, light black and dark black from the second image signals including the image signals associated with the light cyan, dark cyan, light magenta, dark magenta and yellow.

The signal processing means may form the fourth image signal including image signals associated with light cyan, dark cyan, light magenta, dark magenta, yellow, and black from the third image signals including the image signals associated with the light cyan, dark cyan, light magenta, dark magenta, yellow, light black and dark black.

The fourth image signal outputted from the signal processing means may be supplied to an ink jet recording apparatus, each recording head of the ink jet recording apparatus comprising an electro-thermal converting element producing thermal energy that causes film boiling in ink so that an ink droplet is discharged with the growth of bubbles by the film boiling.

According to the present invention, the duty of the recording heads are relatively reduced when the image signal is associated with the edge nozzles of the recording heads in accordance with the image signal, and thus, prevents the occurrence of black lines at boundaries of each scanning, which might be formed by the discharge of ink from the edge nozzles. In addition, a high quality image with few black lines can be achieved by a serial scanning recording apparatus of a simple hardware as well as software construction.

Moreover, since the prevent invention performs the black abstraction processing, UCR processing and black inking processing on the basis of the image signals after the dark/light separation, the volume of recorded inks linearly corresponds to the image signals. This is because it is not before the dark/light separation but only after the separation that the actually discharged ink volume can be predicted. This makes it possible to positively reduce the volume of ink, thereby providing high quality images without the overflow of ink.

The above and other objects, effects, features and advantages of the present invention will become more apparent from the following description of the embodiments thereof taken in conjunction with the accompanying drawings.

BRIEF DESCRIPTION OF THE DRAWINGS

FIGS. 19A–19G are diagrams illustrating the characteristics of dark/light separation tables of the fourth embodiment;

FIGS. 21A, 21B-1, 21B-2, 21B-3, 21C-1, 21C-2, 21C-3, 21D-1, 21D-2 and 21D-3 are diagrams illustrating the characteristics of dark/light separation tables of the fifth embodiment;

DETAILED DESCRIPTION OF PREFERRED EMBODIMENTS

The invention will now be described with reference to the accompanying drawings.

Embodiment 1

Figure 11:
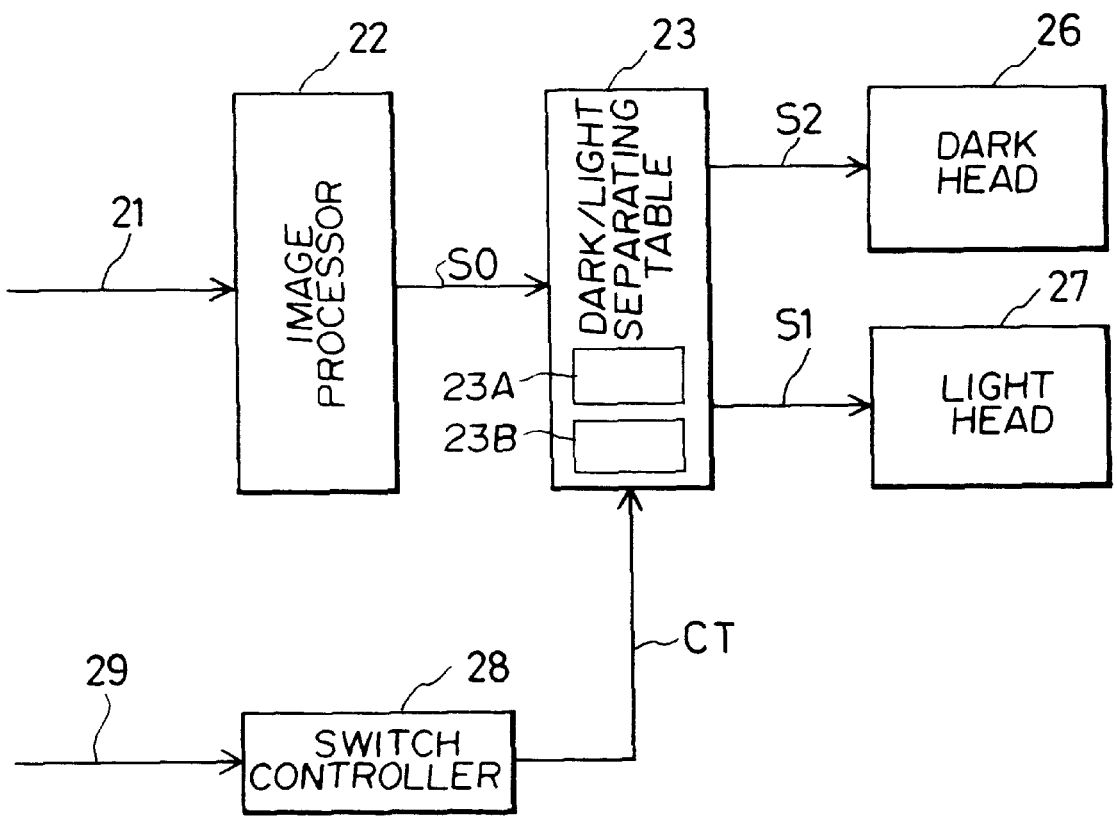
FIG. 11 is a block diagram showing the arrangement of a control system of a first embodiment of an image processing apparatus according to the present invention.

FIG. 11 is a block diagram showing the image signal processing portion of a first embodiment of an ink jet recording apparatus in accordance with the present invention. In the following embodiments, it is assumed that a recording apparatus wherein an ordered dithering or error diffusion technique is employed to convert the input signal into a binary signal, and to control the intensity by the number of dots in superpixels. With regard to these techniques, the description on pages 350–352 of "Output Hardcopy Device", 1988, edited by Robert C. Durbeck et al., Academic Press, Inc. is incorporated here by reference.

Figure 12A:
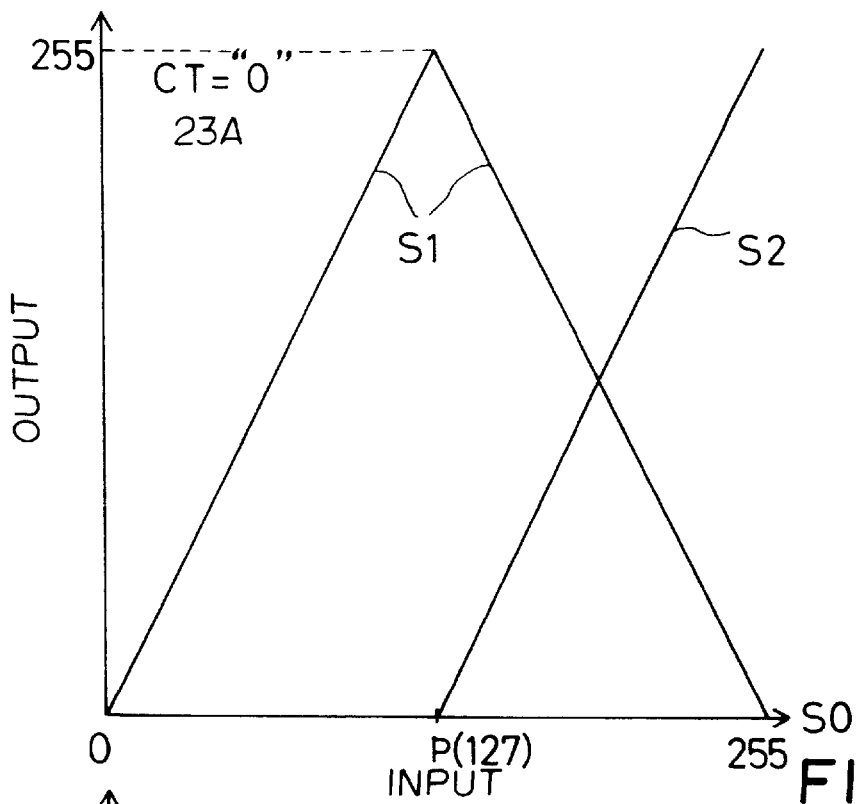
FIG. 12A is a diagram illustrating the characteristics of a dark/light separating table for the image signal S0 corresponding to nozzles other than the edge nozzles of a recording head.
Figure 12B:
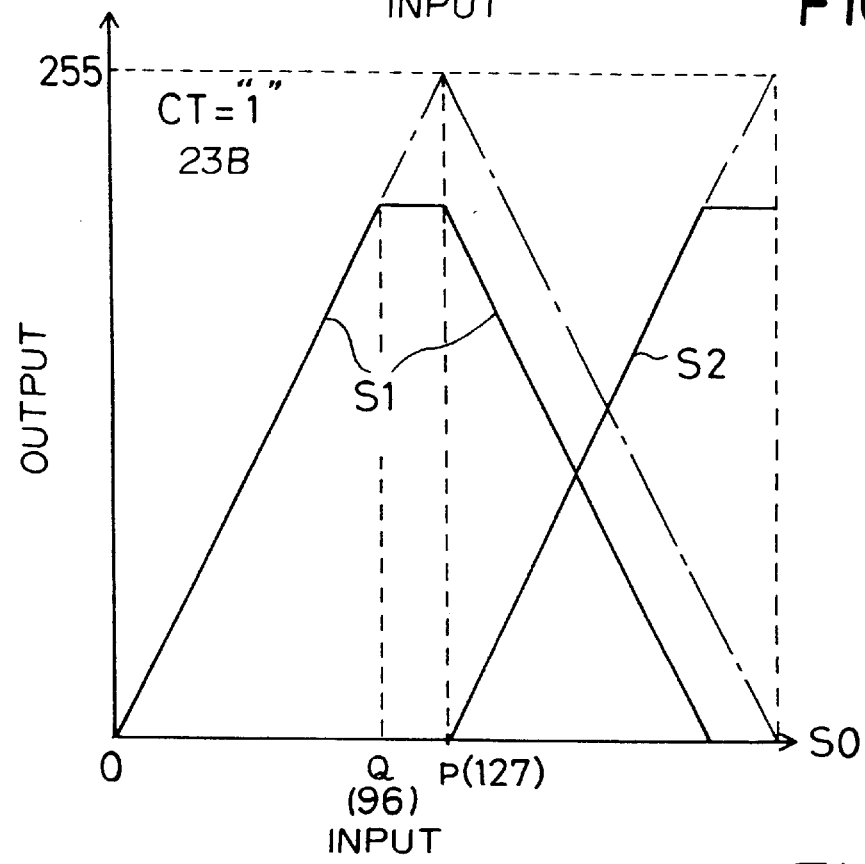
FIG. 12B is a diagram illustrating the characteristics of a dark/light separating table for the image signal S0 corresponding to the edge nozzles of a recording head.

An image signal 21 inputted to this apparatus undergoes processing such as a gamma conversion in an image processor 22, and is supplied to a dark/light separating table 23 as an input image signal S0. The dark/light separating table 23 comprises a ROM storing two types of dark/light separating tables 23A and 23B having separating characteristics as illustrated in FIGS. 12A and 12B, respectively. The two tables 23A and 23B are switched by the control signal CT fed from a switch controller 28. The switch controller 28 comprises a microcomputer or a logic circuit which receives the clock signal of the input image signal 21, and decides whether or not the input image signal 21 corresponds to edge nozzles of recording heads. If the image signal 21 corresponds to the edge nozzles, the switch controller 28 outputs a control signal CT of "1"; otherwise, the switch controller 28 outputs a control signal CT of "0", and sends the control signal CT to the dark/light separating table 23. The table 23 employs the table 23A as shown in FIG. 12A when the control signal CT is "0", and the table 23B as shown in FIG. 12B when the control signal CT is "1".

Figure 8:
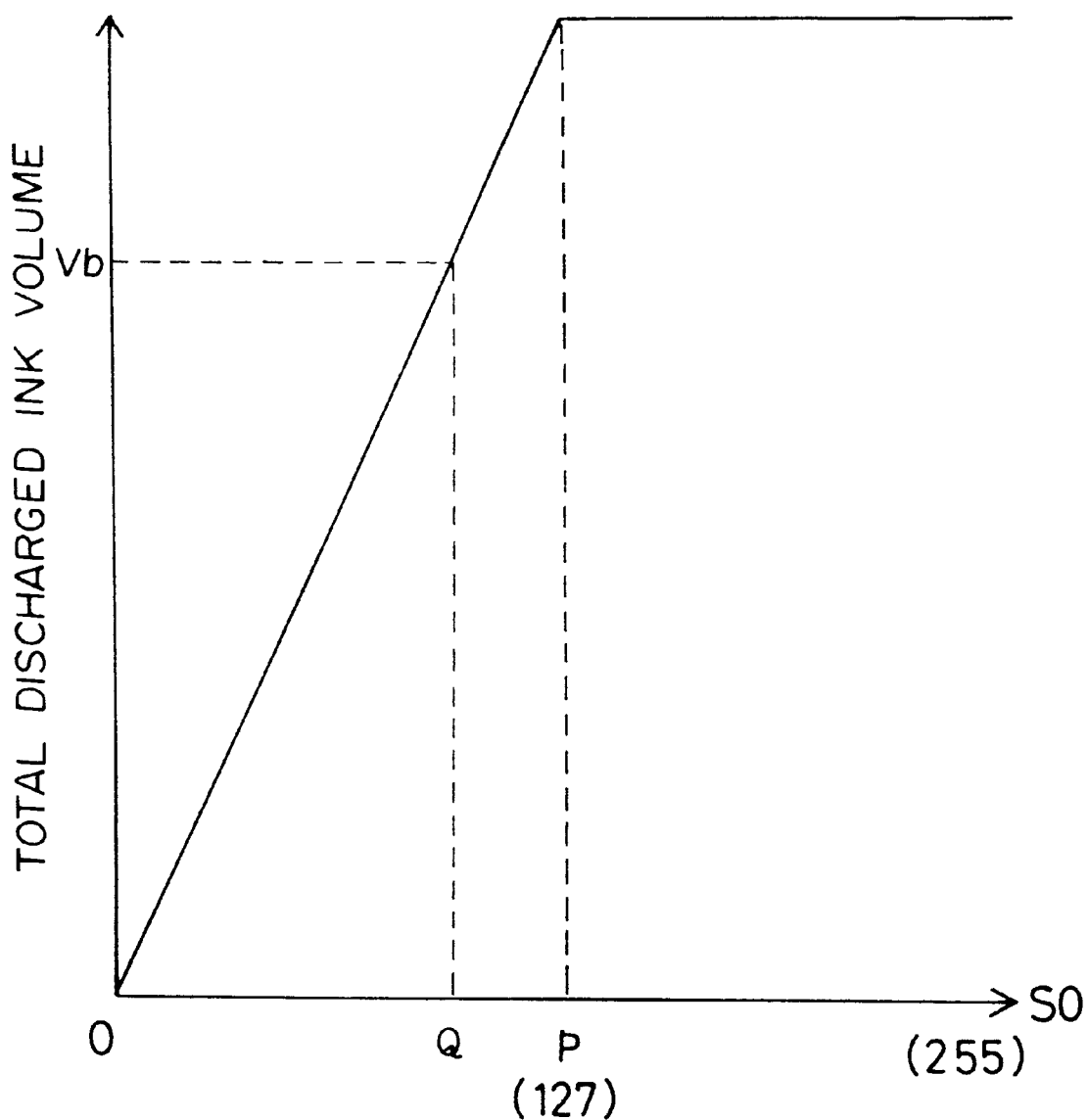
FIG. 8 is a diagram illustrating the relationship between the image signal S0 and the total discharged ink volume in the conventional recording apparatus.
Figure 9:
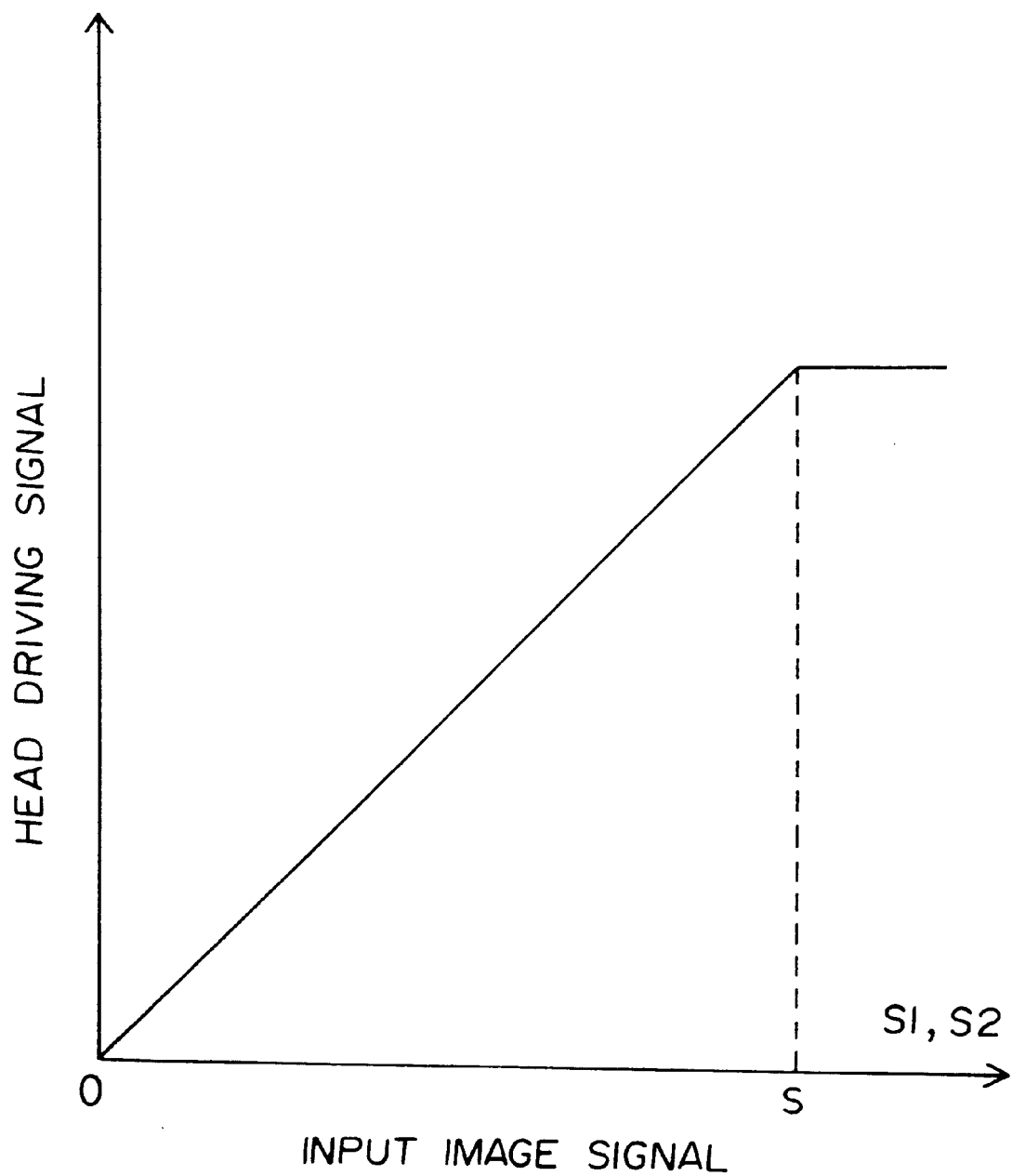
FIG. 9 is a diagram illustrating the conversion of an image signal to restrict the total ink discharge volume.
Figure 13:
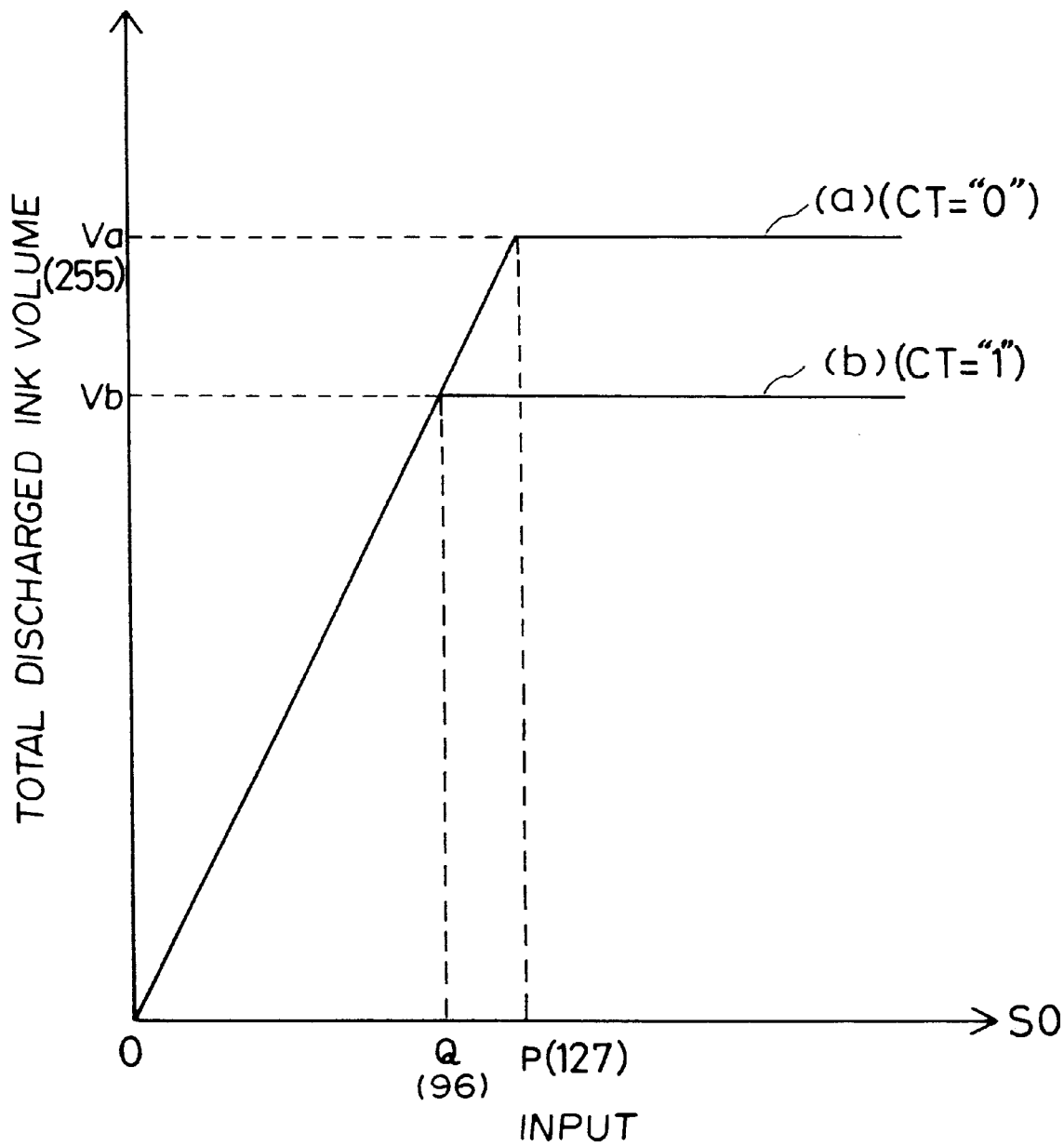
FIG. 13 is a diagram illustrating the relationship between the image signal S0 and the total ink discharge volume.

Using the separating table 23A gives the total discharged ink volume as indicated by a) in FIG. 13. In this case, the total discharged ink volume takes a fixed value Va in the range where the input image signal S0 is greater than P as stated before with regard to FIG. 8. In contrast, using the separating table 23B gives the total discharged ink volume as indicated by (b) in FIG. 13. In this case, the total discharged ink volume takes a fixed value Vb in the range where the input image signal S0 is greater than Q. The fixed value Vb is smaller than Va because the table 23B has separating characteristics as indicated by solid lines in FIG. 12B, which are different from the characteristics of the normal table 23A whose characteristics are indicated by dotted lines. Thus, the ink volume discharged from the edge nozzles of the recording heads is reduced to smaller values than in the normal case, thereby preventing black lines from occurring.

Here, the values P and Q can be determined as follows: First, the value P is determined depending on (1) the concentrations of the dark and light inks, and (2) the color development characteristics of each recording medium. Although the value P is set at 127 or half the maximum value of the image signal in this embodiment, it is not limited thereto. On the other hand, the value Q is determined depending on the running characteristics of a recording medium, and is experimentally determined by printing to achieve optimum results. Furthermore, the figure of FIG. 12B is not restricted to a trapezoid: a trapezium whose top side slopes can also be employed.

The edge nozzles are specified in accordance with the amount of ink running. Thus, the edge nozzles are defined as each one nozzle or a few nozzles at the top and bottom of the nozzle array in accordance with pixel density and ink absorption ratio of a recording medium.

Embodiment 2

In the first embodiment, the total ink discharge volume is restricted if the image signal supplied to the edge nozzles indicates a high intensity image. However, if the image signal associated with the boundaries of a recording indicates high intensity in isolation, the spread of the image width due to ink running will be small. In such a case, the first embodiment may present a problem because it reduces the discharge volume from the edge nozzles regardless of this fact. In contrast, large volume of ink discharged from the nozzles near the edges will cause ink running, and hence, the discharge volume from the edge nozzles may have to be further reduced to achieve a sufficient compensating effect. The second embodiment according to the present invention is implemented in view of this problem.

Figure 1:
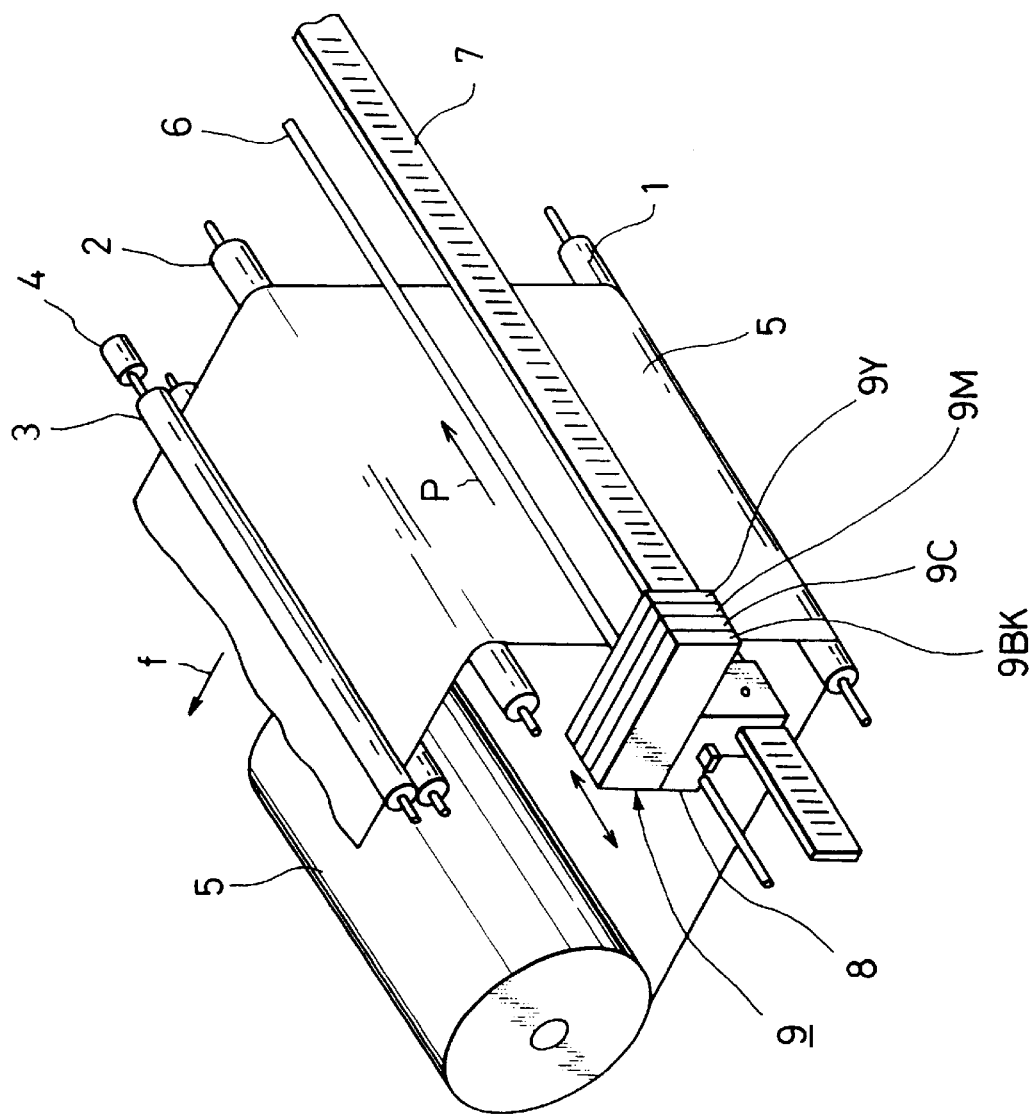
FIG. 1 is a schematic perspective view showing an example of an ink jet recording apparatus.
Figure 2B:
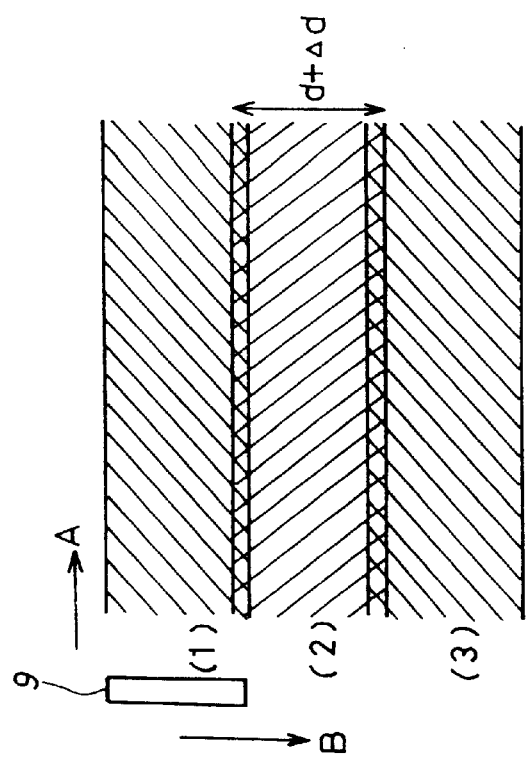
FIGS. 2A and 2B are diagram illustrating boundaries in a conventional serial type ink jet recording apparatus.
Figure 2A:
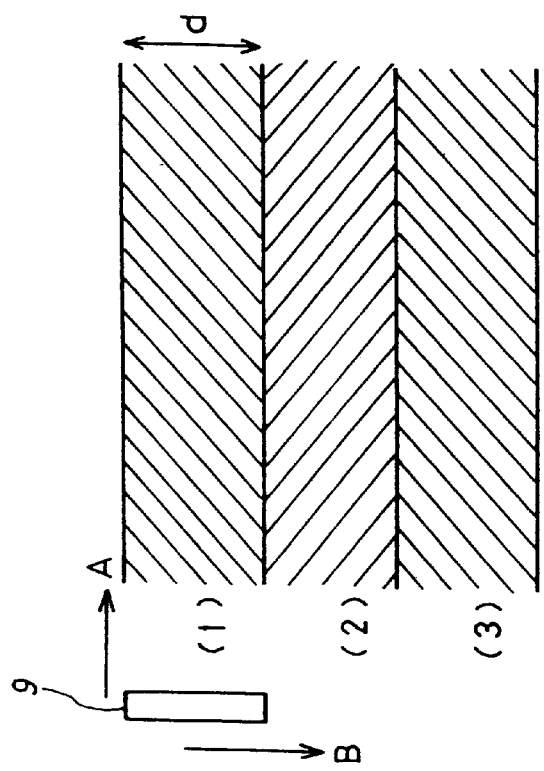
Figures 14A, 14B:
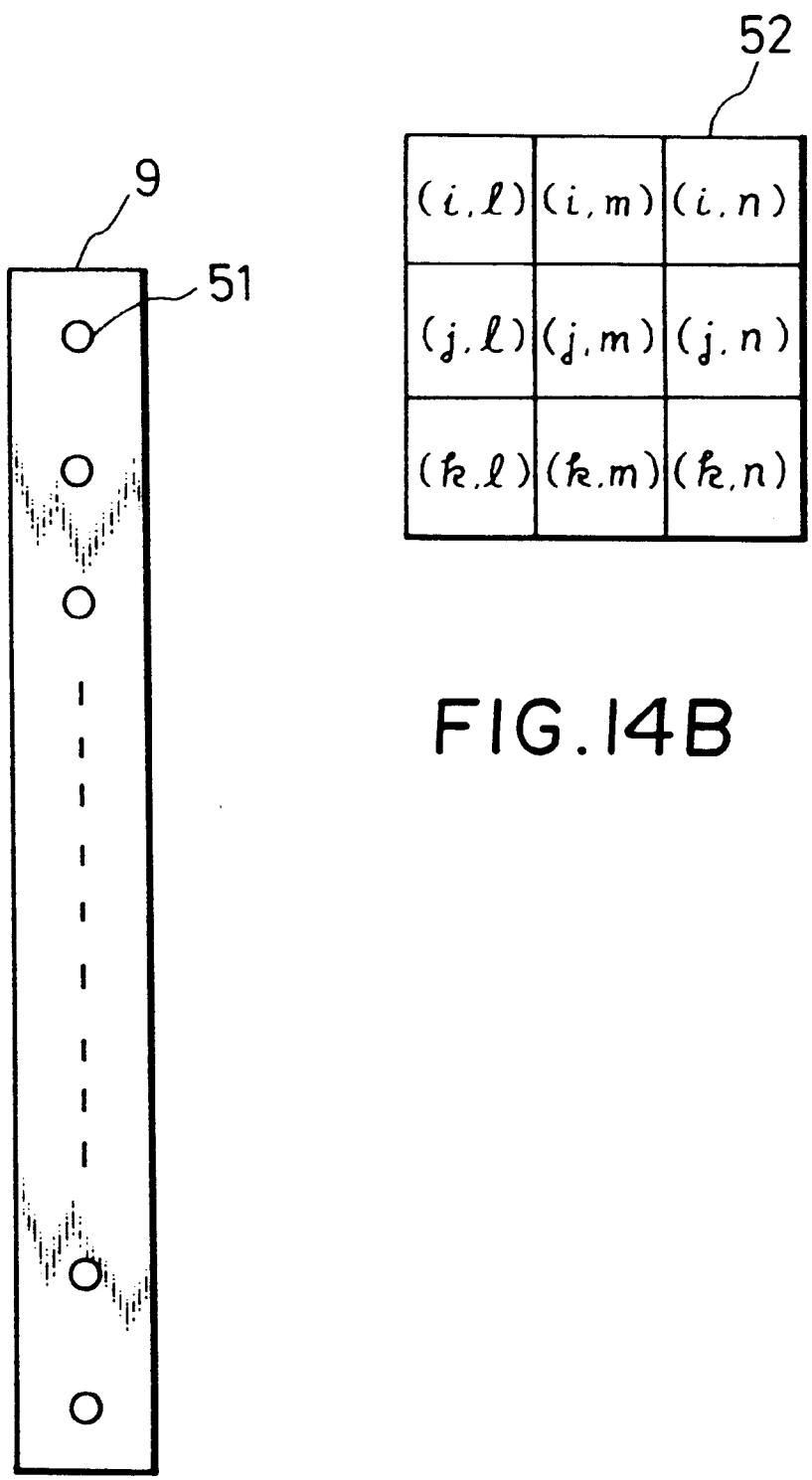
FIGS. 14A and 14B are diagrams illustrating the principle of a second embodiment of an image processing apparatus according to the present invention.

FIG. 14A schematically illustrates the nozzle array of the recording head 9 as shown in FIG. 1. Reference numeral 51 designates nozzles. FIG. 14B illustrates a matrix 52 of image data where the row i indicates the image data supplied to the bottom nozzle of the recording head 9 during the previous scanning of the head, the row j represents the image data supplied to the top nozzle of the recording head 9 during the current scanning of the head, and the row k indicates the image data applied immediately below the top nozzle, that is, the second top nozzle. In addition, the m column indicates the image data associated with the current discharge, the l column represents the image data associated with the previous discharge, and the n column indicates the image data associated with the next discharge.

In this embodiment, a 3.times.3 pixel matrix is used which is arranged around the central pixel (j,m) recorded by the discharge from the edge nozzle so that the volume of ink discharged from the edge nozzle is controlled by the sum of the image data in the matrix. More specifically, each image data in the matrix is weighted in accordance with the location in the matrix by multiplying it by a weighting coefficient, and the total sum of the weighted image data is then calculated. If the total sum exceeds a predetermined value, the value of the image data applied to the edge nozzle is limited.

Figure 15:
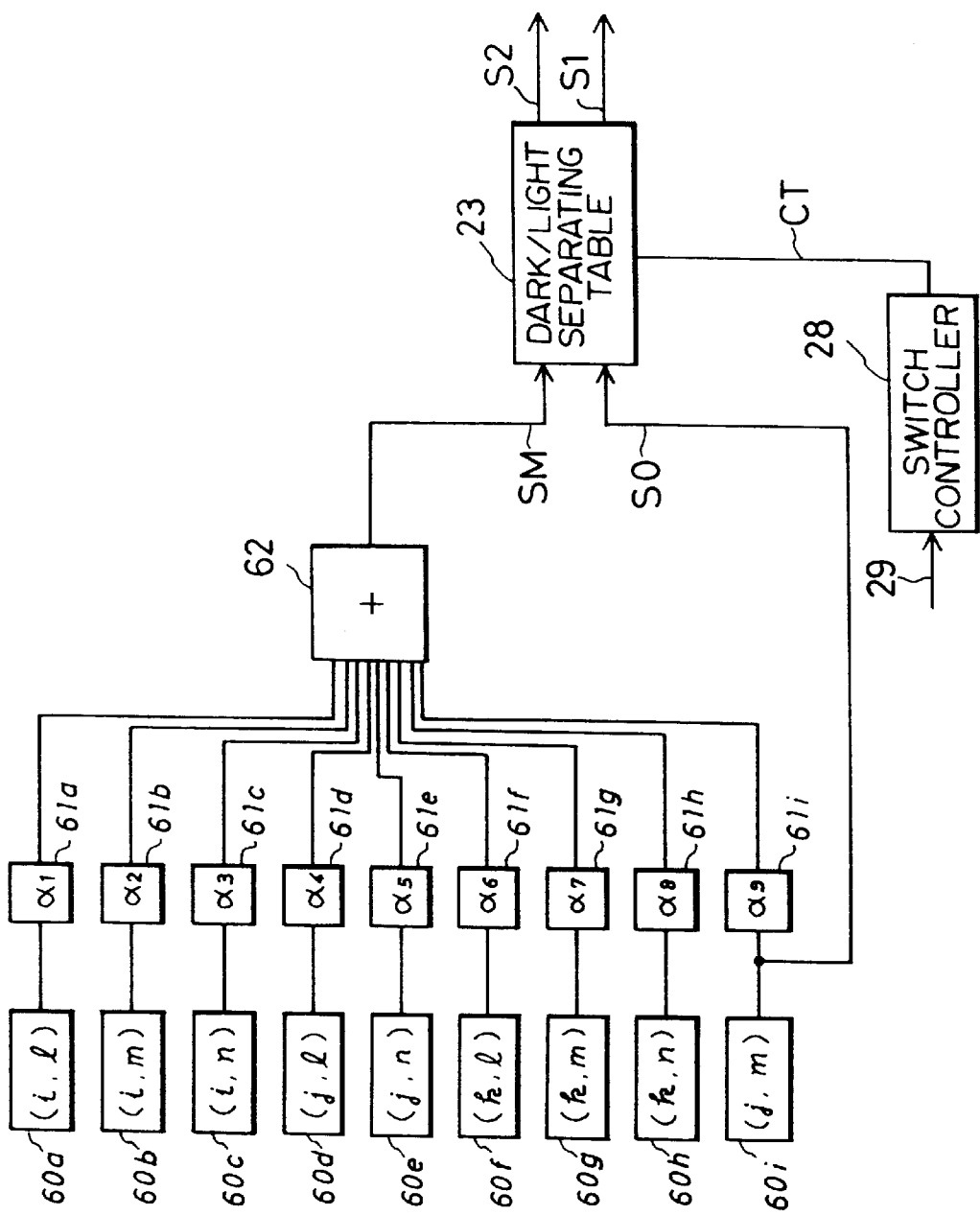
FIG. 15 is a block diagram showing the arrangement of a controlling system of the second embodiment of the image processing apparatus according to the present

FIG. 15 is a block diagram showing the arrangement of a controlling portion performing the processing described above.

Figure 16A:
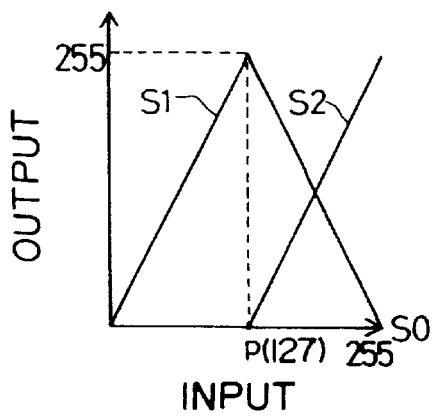
FIGS. 16A–16F are diagrams illustrating the characteristics of dark/light separation tables of the second embodiment.
Figure 16B:
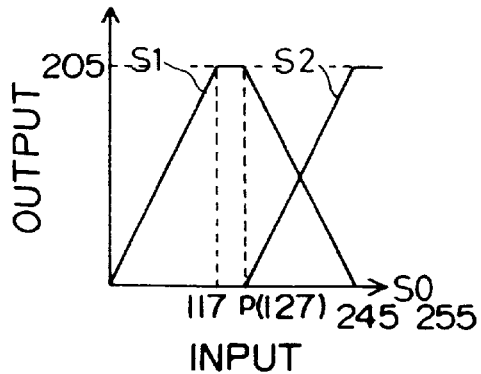
Figure 16C:
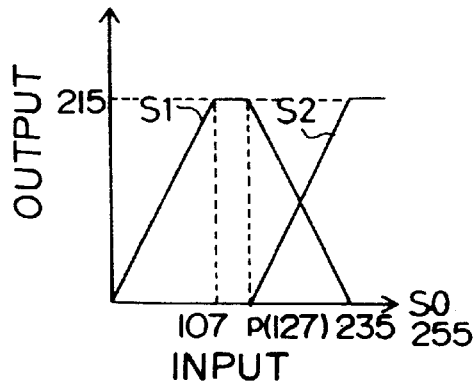
Figure 16D:
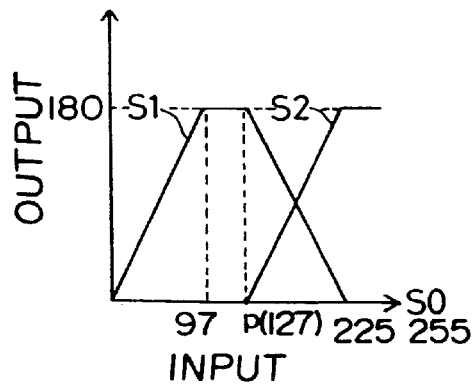
Figure 16E:
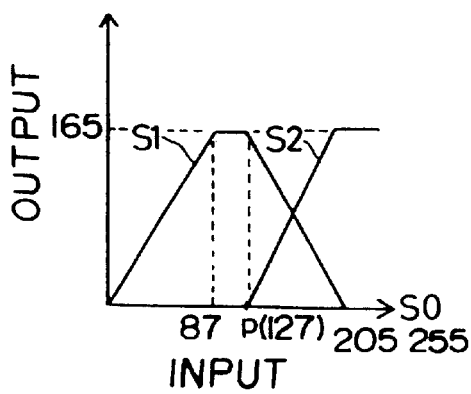
Figure 16F:
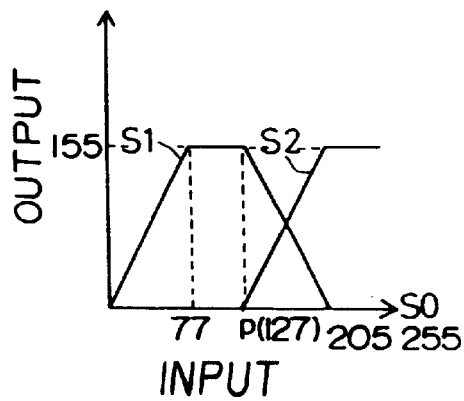

In FIG. 15, reference numerals $60a$–$60i$ denotes buffers for temporarily storing the image data as shown in FIG. 14B. The image data outputted from the buffers $60a$–$60i$ are supplied to multipliers $61a$–$61i$. The multipliers $61a$–$61i$ multiply weighting coefficients .alpha.1-.alpha.9 by the image data, respectively, and provides the results for an adder 62. The adder 62 adds all the outputs of the multipliers $61a$ $61i$, and supplies the resultant sum SM to the dark/light separating table 23 including a ROM. The dark/light separating table 23 stores six types of dark/light separating tables the characteristics of which are shown in FIGS. 16A–16F. These six table are different in the degree to which they restrict the ink volume, and are switched by the control signal CT sent from the switch controller 28 and the sum SM fed from the adder 62. More specifically, when the control signal CT is "0" the separating table whose characteristics are shown in FIG. 16A is selected. On the other hand, when the control signal CT is "1", one of the five tables whose characteristics are shown in FIGS. 16B–16F is selected in accordance with the sum SM fed from the adder 62. For example, if the sum SM is small, the table whose characteristics are shown in FIG. 16B is selected; this table has a small degree of restriction. As the sum SM increases, the degree of restriction is raised as illustrated in FIGS. 16C–16F.

According to the second embodiment, the ink volume discharged from the edge nozzles is restricted, taking into account net only the image data associated with the edge nozzles but also the nozzles near the edge nozzles, thus effectively preventing black lines from occurring.

Embodiment 3

The present invention can be applied to a color recording apparatus as in a third embodiment. Since the color recording uses recording heads for a plurality of colors, the ink volume exceeds that of a monochromatic recording. Since the total ink volume for one pixel is the sum of all colors, independent application of the present invention to each color cannot achieve a sufficient compensatory effect. The present embodiment improves this situation.

Figure 17:
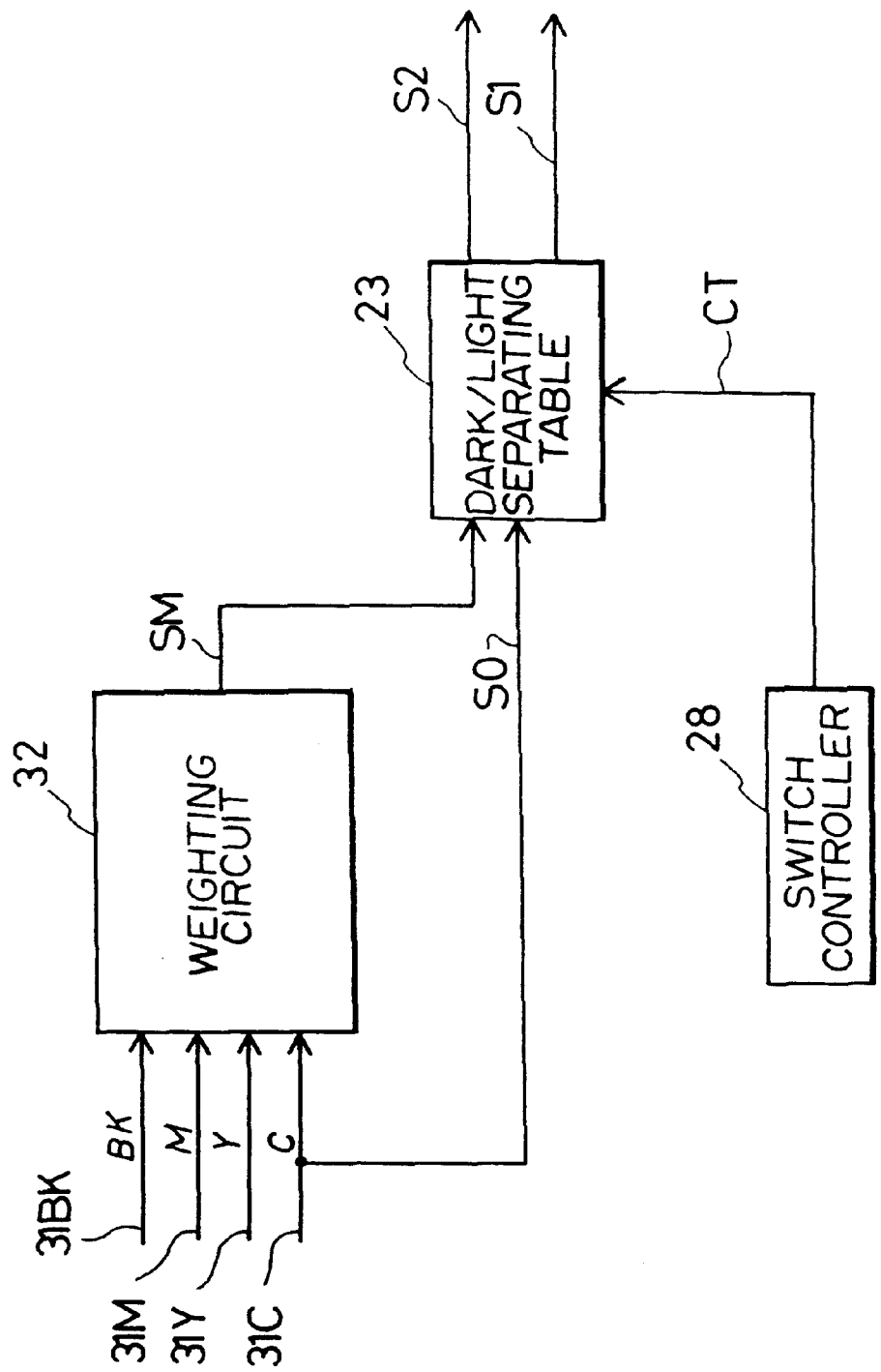
FIG. 17 is a block diagram showing the arrangement of a controlling system of a third embodiment of the image processing apparatus according to the present invention.

FIG. 17 is a block diagram of a controlling system in accordance with the third embodiment. Reference characters 31BK, 31M, 31Y and 31C denote input image signals for black, magenta, yellow and cyan, respectively. These signals are inputted to a weighting circuit 32 which performs a weighted summation on respective image signals. Assuming that the values of the cyan, magenta, yellow and black image signals are C, M, Y and BK, the sum SM is given by $$SM=.alpha.1C+.alpha.2M+.alpha.3Y+.alpha.4BK$$

where .alpha.1-.alpha.4 are weighting coefficients which can be obtained experimentally from the spread ratio of each color ink. If the simple summing achieves a sufficient compensatory effect, they can be determined as alpha.1=.alpha.2=.alpha.3=.alpha.4=1.

The sum SM is inputted to the dark/light separating table 23 which stores the six types of tables the characteristics of which are shown in FIGS. 16A–16F, and selects one of them most suitable for separating the cyan image signal in accordance with the control signal CT and the sum signal SM. Thus, the ink restriction at the edges of the recording heads is carried out taking account of the total volume of all the color inks, thereby preventing black lines from occurring.

In the three embodiments described above, although a pair of dark and light heads for each color are employed, the present invention can also be applied to the case where a set of three or more heads are used for each color.

Embodiment 4

In the embodiments described above, the occurrence of black lines at boundaries is prevented by using different separating tables for edge nozzles and the other nozzles.

The ink discharge volume, however, changes depending on the temperature of the recording heads. This is because the viscosity of ink is reduced, and hence, the ink discharge volume increases as the temperature rises. Accordingly, when the recording heads continue recording to reach a high temperature, or are used in a high ambient temperature, the ink discharge volume increases, thereby causing more distinct black lines. The fourth embodiment controls the selection of the separating tables in view of this fact.

Figure 18:
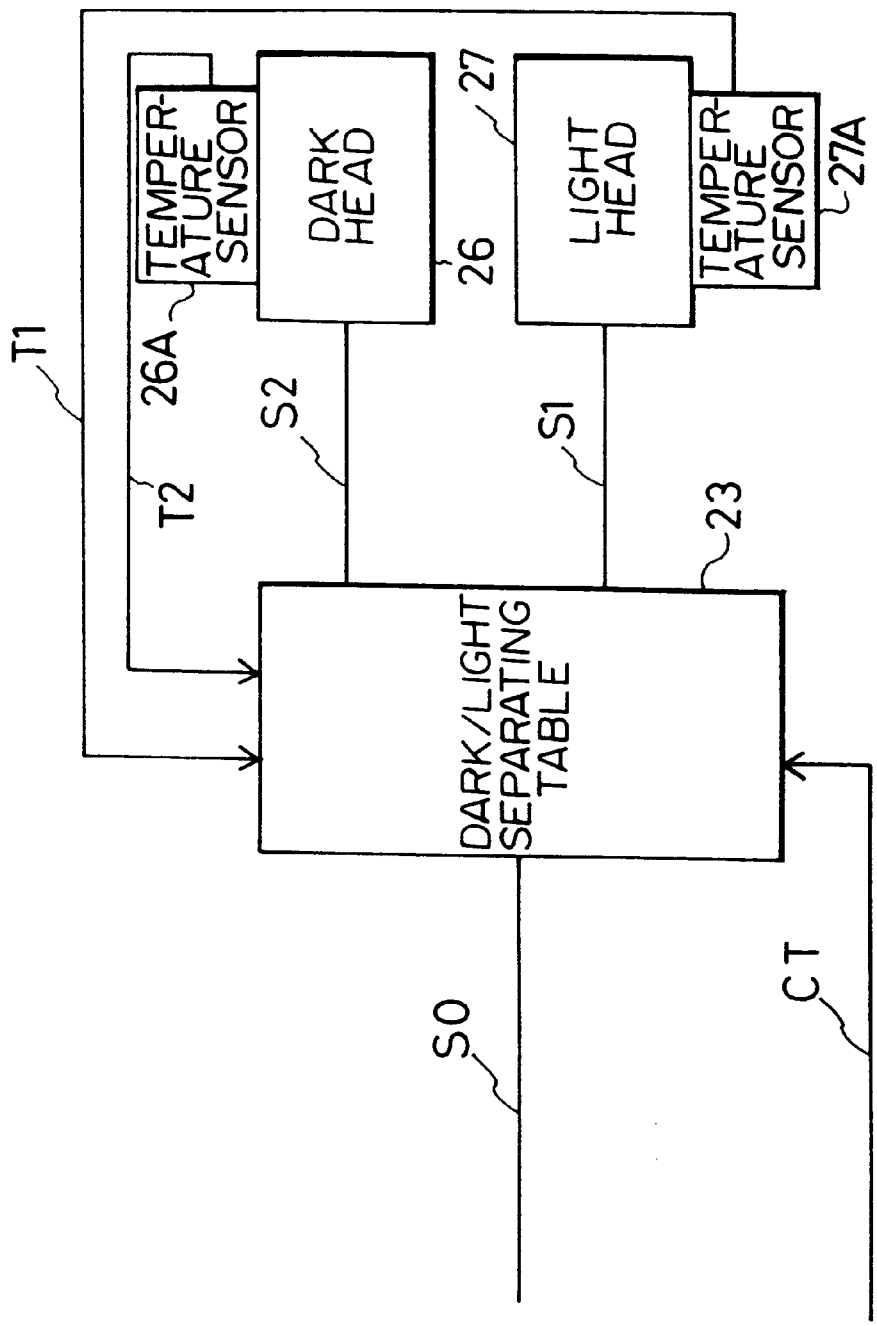
FIG. 18 is a block diagram showing the arrangement of a controlling system of a fourth embodiment of the image processing apparatus according to the present invention.

FIG. 18 is a block diagram showing the arrangement of a controlling system associated with the fourth embodiment of the present invention. In this figure, the input image signal S0 is inputted to the dark/light separating table 23 including a ROM storing dark/light separating tables the characteristics which are shown in FIGS. 19A–19G, and is separated into the dark signal S2 and the light signal S1. The dark signal S2 and the light signal S1 are inputted to a dark head portion 26 and a light head portion 27, respectively, to form an image by discharging dark ink and light ink. Temperature sensors 26A and 27A are attached to these head portions 26 and 27, respectively. The temperature sensors 26A and 27A detect the temperature of the head portions 26 and 27, and supply the dark/light separating portion 23 with temperature signals T2 and T1.

The control signal CT takes a value "1" if the image signal S0 fed to the dark/light separating table 23 corresponds to the edge nozzles, and otherwise takes a value "0". When the control signal CT is "0", a separating table the characteristics of which are shown in FIG. 19A is used.

When the control signal CT is "1" and the temperatures of all the recording heads are kept within a predetermined range (below 45.degree. C., for example), a separating table the characteristics of which are shown in FIG. 19B is employed so that the maximum ink volume discharged from the dark and light heads are restricted, thereby preventing black lines from occurring at the boundaries.

When the temperature of the light head rises, the maximum value of the light signal S1 is further limited in accordance with the degree of the temperature rise as shown in FIGS. 19C and 19D. On the other hand, if the temperature of the dark head rises, the maximum value of the dark signal S2 is further limited in accordance with the degree of the temperature rise as shown in FIGS. 19E and 19F. Moreover, if the temperatures of both the dark and light heads rise, the maximum values of both the dark and light signals S1 and S2 are limited by a table the characteristics of which are shown in FIG. 19G.

According to this embodiment, one of the dark/light separation tables the characteristics of which are shown in FIGS. 19A–19G is selected in accordance with the temperatures of the dark and light heads so that the occurrence of black lines is prevented independently of the temperature.

Embodiment 5

The weighted summation on the image data using the neighboring pixels as in the second embodiment can be applied to the method of the fourth embodiment which selects one of the separating tables taking account of the temperatures of the recording heads.

Figure 20:
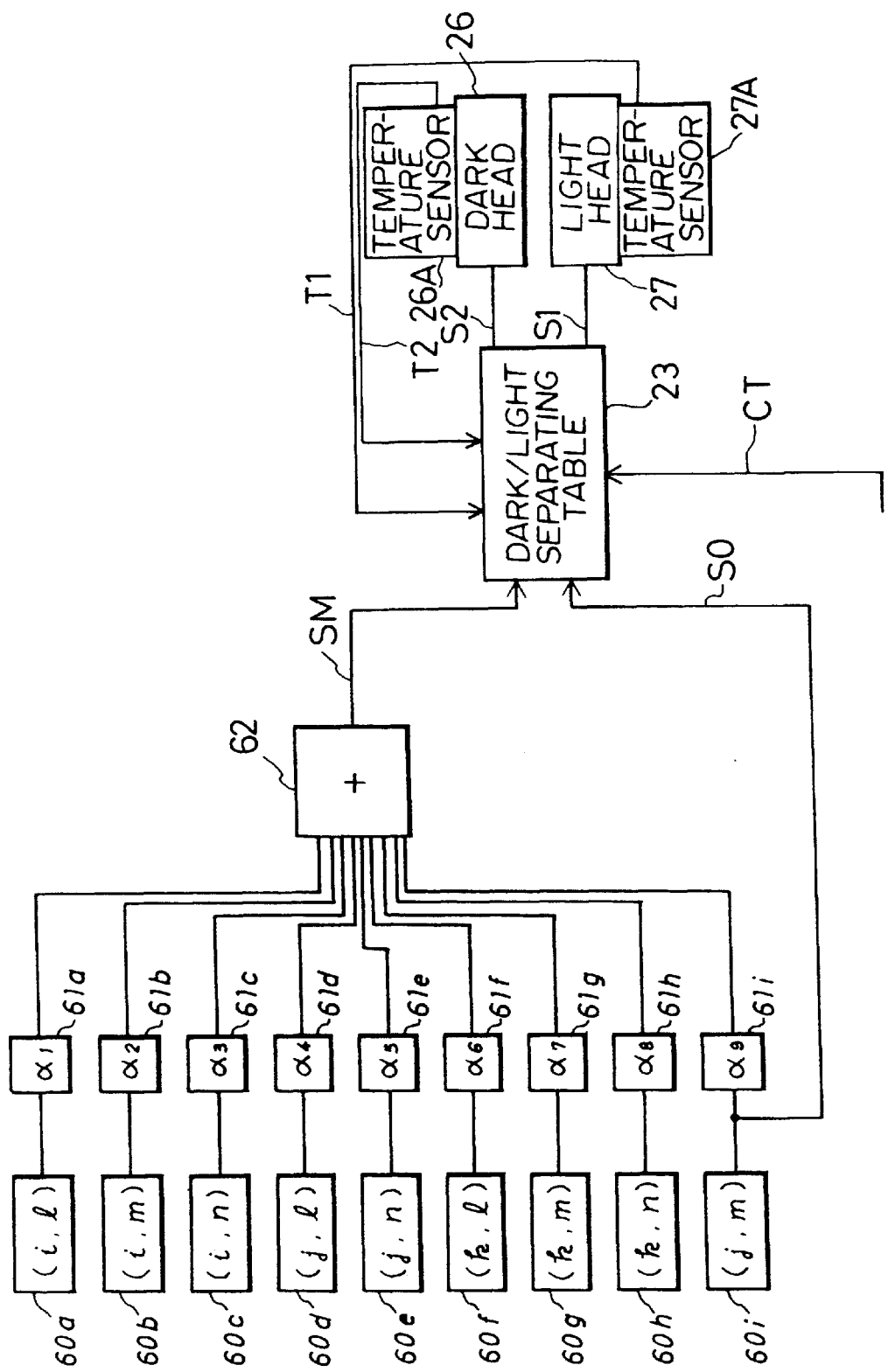
FIG. 20 is a block diagram showing the arrangement of a controlling system of a fifth embodiment of the image processing apparatus according to the present invention.

FIG. 20 is a block diagram of an example of a control system for such processing. In this figure, like reference numerals denote like portions in FIG. 15, and hence, the description thereof is omitted here. The dark/light separating table 23 comprises a plurality of tables the characteristics of which are shown in FIGS. 21A to 21D, and selects one of them in response to the sum SM, the temperature T2 of the dark head, the temperature T1 of the light head, and the control signal CT.

Figure 3:
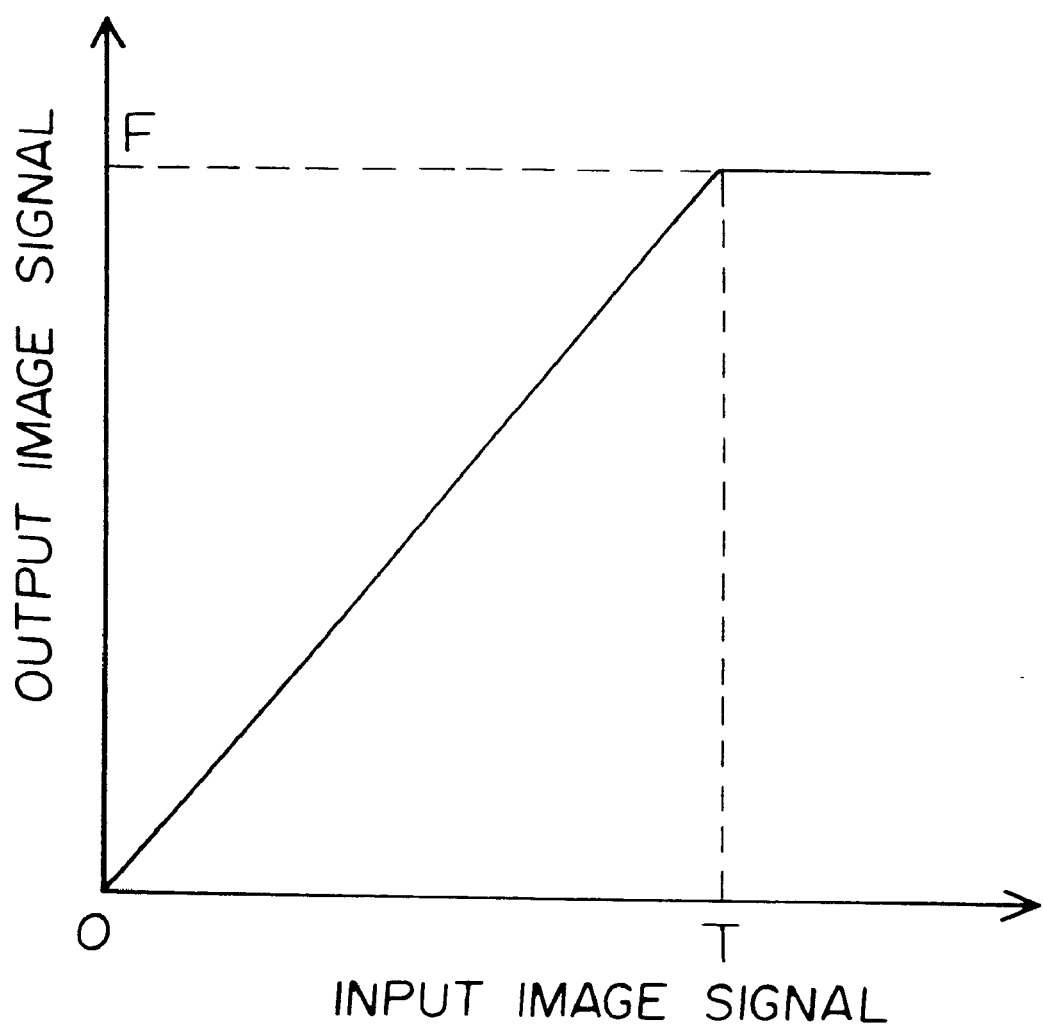
FIG. 3 is a diagram illustrating the characteristics of a conventional correction table for the edge nozzles of recording heads.
Figure 21A:
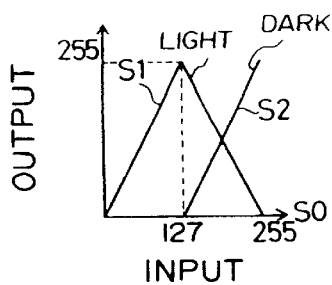
Figures 1, 21B:
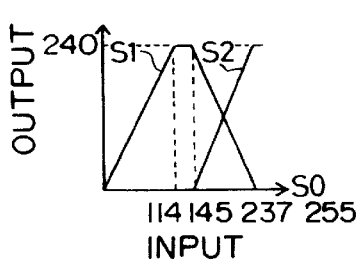
Figures 2, 21B:
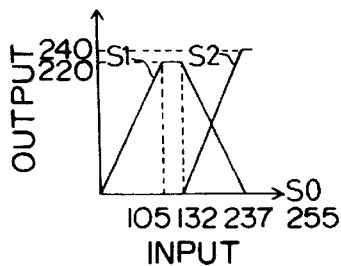
Figures 3, 21B:
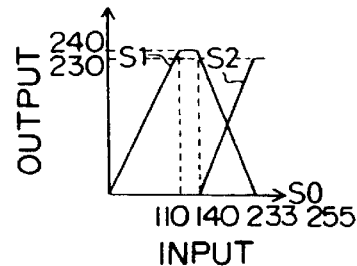
Figures 1, 21C:
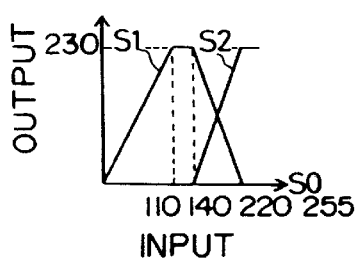
Figures 2, 21C:
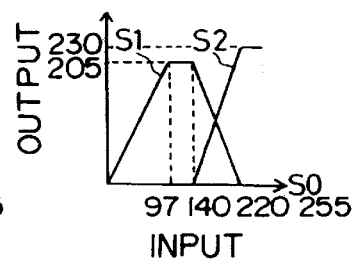
Figures 3, 21C:
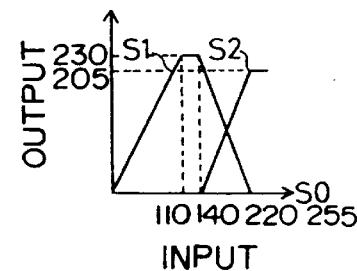
Figures 1, 21D:
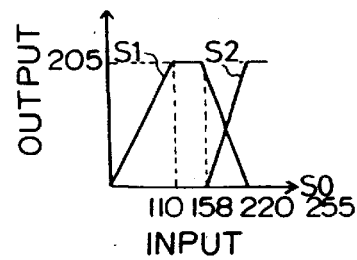
Figures 2, 21D:
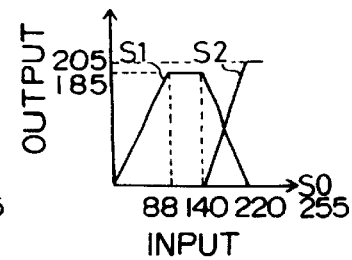
Figures 3, 21D:
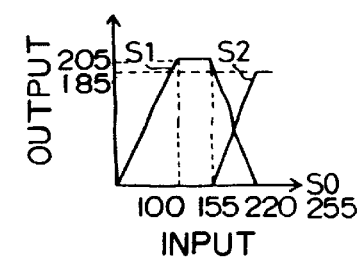

FIGS. 21A–21D illustrate the characteristics of separating tables employed in this embodiment. When the control signal CT is "0", that is, when the input image signal S0 does not correspond to the edge nozzles, the separating table whose characteristics are shown in FIG. 21A is used. On the other hand, when the control signal is "1", that is, when the input image signal S0 corresponds to the edge nozzles, the separating table is switched from the table shown in FIG. 21B-1, to that whose characteristics are shown in FIG. 21C-1, and then to that whose characteristics are shown in FIG. 21D-1, as the sum SM increases. For example, if the temperatures of the recording heads are maintained within a predetermined temperature range (below 45.degree. C., for example) and the sum SM is also within a predetermined range, the table whose characteristics are shown in FIG. 21B-1 is used. If the temperatures of the recording heads are in the predetermined temperature range and the sum SM increases beyond the predetermined range, one of the tables whose characteristics are shown in FIGS. 21C-1 and 21D-1 is selected in accordance with the value of the sum SM. If the temperatures of the recording heads exceeds the predetermined temperature range (45.degree. C., for example), one of the tables other than these primary tables is selected. For example, if the temperature of the light head exceeds the predetermined temperature range while the primary table as shown in FIG. 21C-1 is selected in accordance with the sum SM, the table whose characteristics are shown in FIGS. 21C-2 is selected. Further, if the temperature of the dark head exceed the predetermined range (45.degree. C., for example), the table whose characteristics are shown in FIG. 21C-3 is selected.

In summary, the table is selected according to the rules as shown in Table 1.

TABLE 1

| Control Signal | | | | Table to |
|---|---|---|---|---|
| (CT) | SM | T1 | T2 | be selected |
| 0 | — | — | — | 21A |
| 1 | small | low | low | 21B-1 |
| 1 | small | high | low | 21B-2 |
| 1 | small | low | high | 21B-3 |
| 1 | medium | low | low | 21C-1 |
| 1 | medium | high | low | 21C-2 |
| 1 | medium | low | high | 21C-3 |
| 1 | large | low | low | 21D-1 |
| 1 | large | high | low | 21D-2 |
| 1 | large | low | high | 21D-3 |

If both temperature signals exceed the predetermined temperature range, the table that restricts both maximum values for the dark and light heads should be selected.

According to the fifth embodiment, the occurrence of black lines can be prevented taking into account the ink volumes of neighboring pixels.

Embodiment 6

Figure 22:
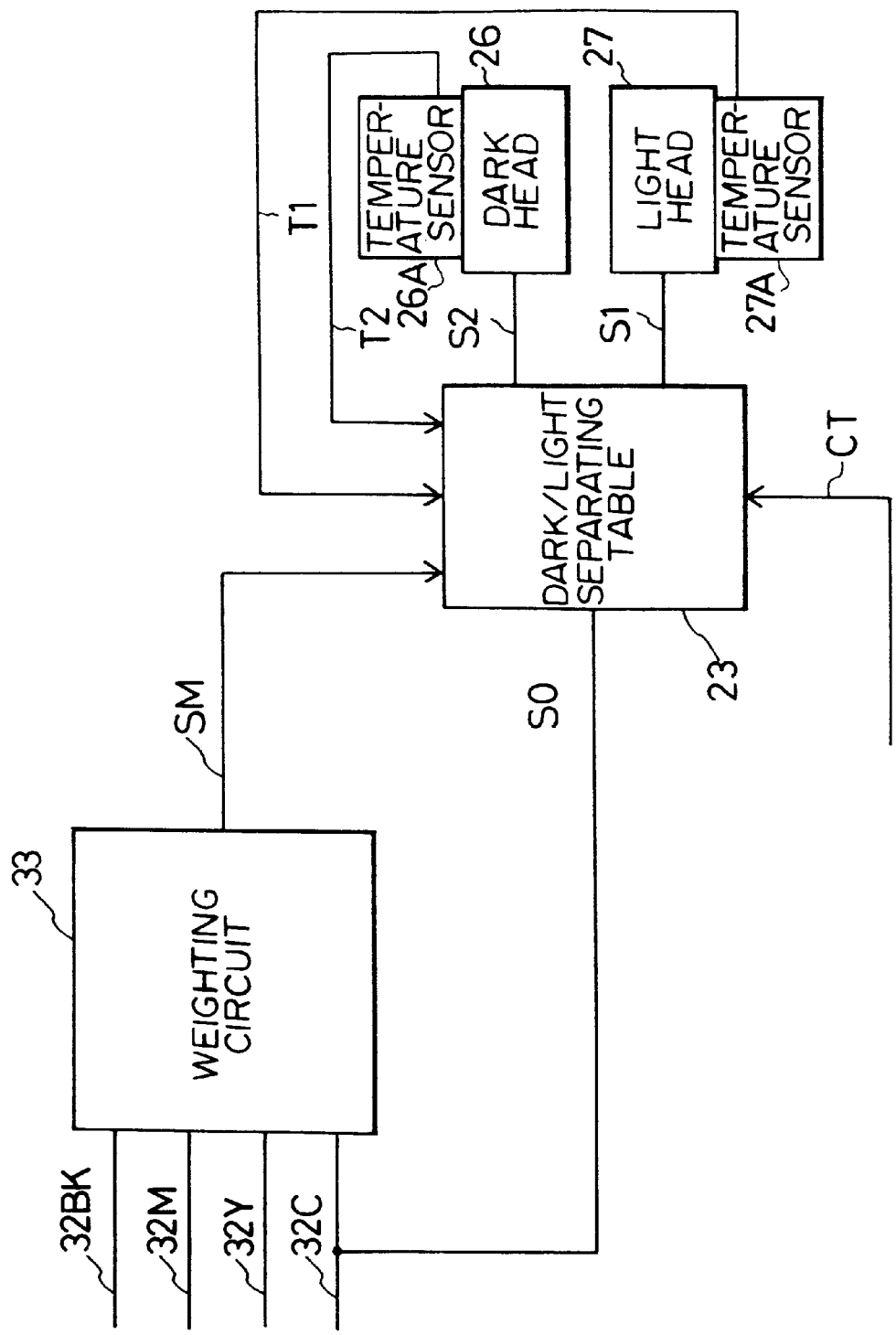
FIG. 22 is a block diagram, showing the arrangement of a controlling system of a sixth embodiment of the image processing apparatus according to the present invention.

The temperatures of the recording heads can be taken into consideration in the color recording as in the third embodiment. FIG. 22 is a block diagram showing the arrangement of a control system associated with a sixth embodiment of the present invention.

The weighted sum SM of respective colors is inputted to the dark/light separating table 23. The separating table 23 stores ten types of tables whose characteristics are shown in FIGS. 21A–21D, and selects the optimum separating table in accordance with the control signal CT, the sum SM and the head temperatures T1 and T2. Thus, the volume of ink discharged from the edge nozzles can be limited in accordance with the temperatures of the recording heads taking into account the ink volume of each color, thereby preventing the occurrence of the black lines boundaries.

Although the multi-level image signal is used to drive the recording heads in the embodiments described above, a binary image signal consisting of only two levels of "0" and "1" can also be used to obtain similar effect by subsampling "1" signal at a certain probability instead of restricting the dark level.

Embodiment 7

A seventh embodiment is implemented by applying the present invention to a full color, serial scanning type ink jet recording apparatus employing four ink jet recording heads of black, cyan, magenta and yellow as shown in FIG. 1. It is assumed here that recordings are performed in the order of black, cyan, magenta and yellow.

Figure 23:
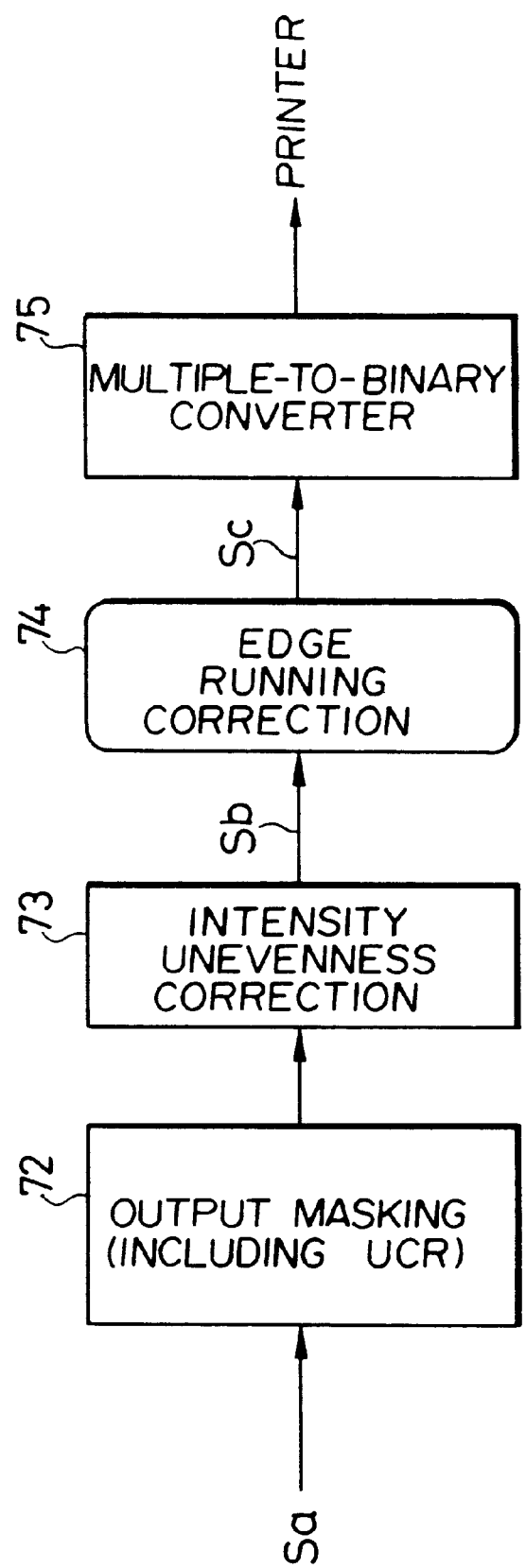
FIG. 23 is a block diagram showing the arrangement of a processing system of a seventh embodiment of the image processing apparatus according to the present invention.

FIG. 23 is a block diagram showing the arrangement of a control system associated with the seventh embodiment. An input image signal Sa is commonly a multi-level image signal fed from an external machine such as an image reader, and has undergone processings such as error correction, UCR (Under Color Removal), or the like. The image signal Sa is subjected to correction in accordance with the characteristics of inks in a output masking portion 72, followed by correction in accordance with the output characteristics of the recording heads in an intensity unevenness correction portion 73. The output of the portion 73 is supplied to an edge running correction portion 74 as an input image signal Sb. The edge running correction portion 74 corrects only the black signal of the input image signal Sb, and supplies the corrected signal Sc to a multiple-to-binary converter 75 which converts the signal Sc into the binary representation and applies it to the recording heads.

The operation of the edge running correction portion 74 will now be described. In the description below, the black components of the signals Sb and Sc before and after the correction are referred to as Sbbk and Scbk, respectively. Further, the heads are employed which comprises 256 nozzles with 400 dpi, and the edge running correction according to the present invention is performed on each one nozzles at the top and bottom of the nozzle array of the recording head, that is, the total of two nozzles of the head.

Figure 24:
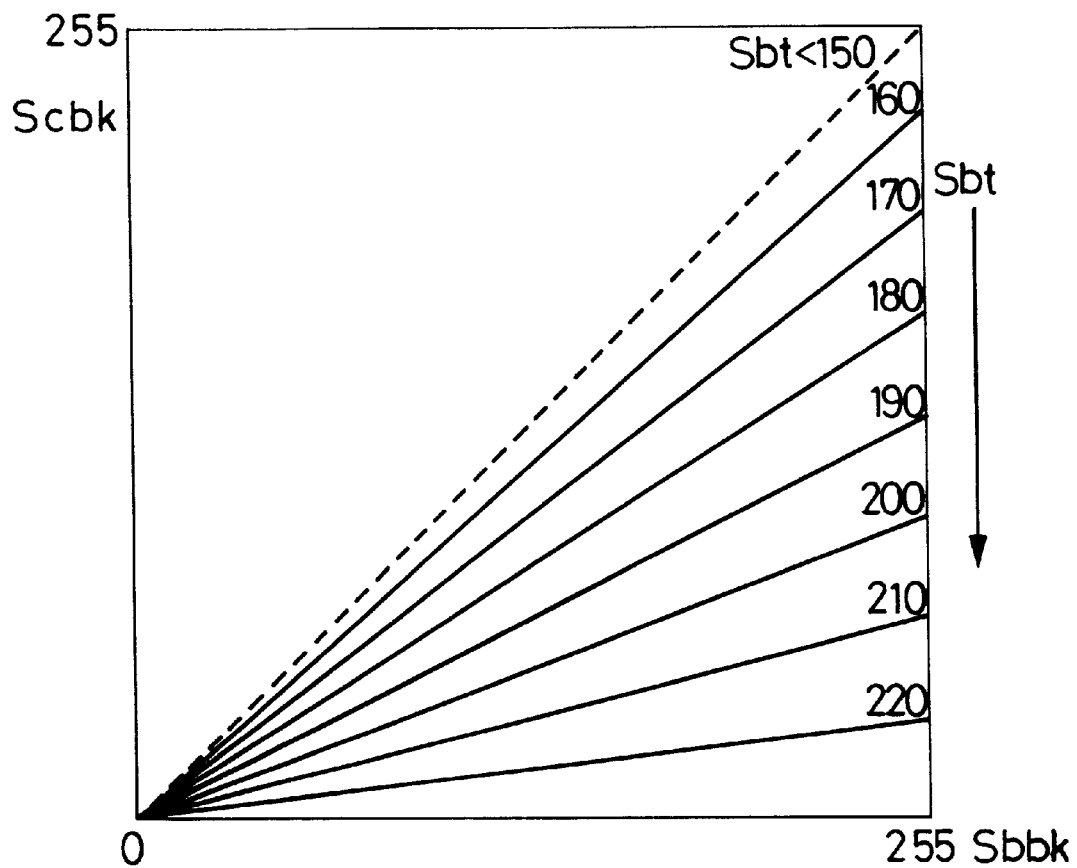
FIG. 24 diagram illustrating an algorithm for controlling the relationship between the input and output of a portion for correcting ink running at boundaries of an image using the total input image signal Sbt.

FIG. 24 illustrates the relationships between the black signals Sbbk and Scbk before and after the correction at the scanning boundaries, and the total input image signal Sbt (=C+M+Y+BK of the signal Sb). As will be seen from this figure, one of the functions defining the relationship between the black signals Sbbk and Scbk before and after the correction is selected by the total input image signal Sbt so that the black signal Sbbk is converted into the black signal Scbk. More specifically, as the total input image signal Sbt increases, a function which decreases the output black signal Scbk is selected. The values shown in FIG. 24 are those for heavy coat paper. Although linear functions are shown in this figure, higher order functions represented by curves can achieve better accuracy.

Figure 25:
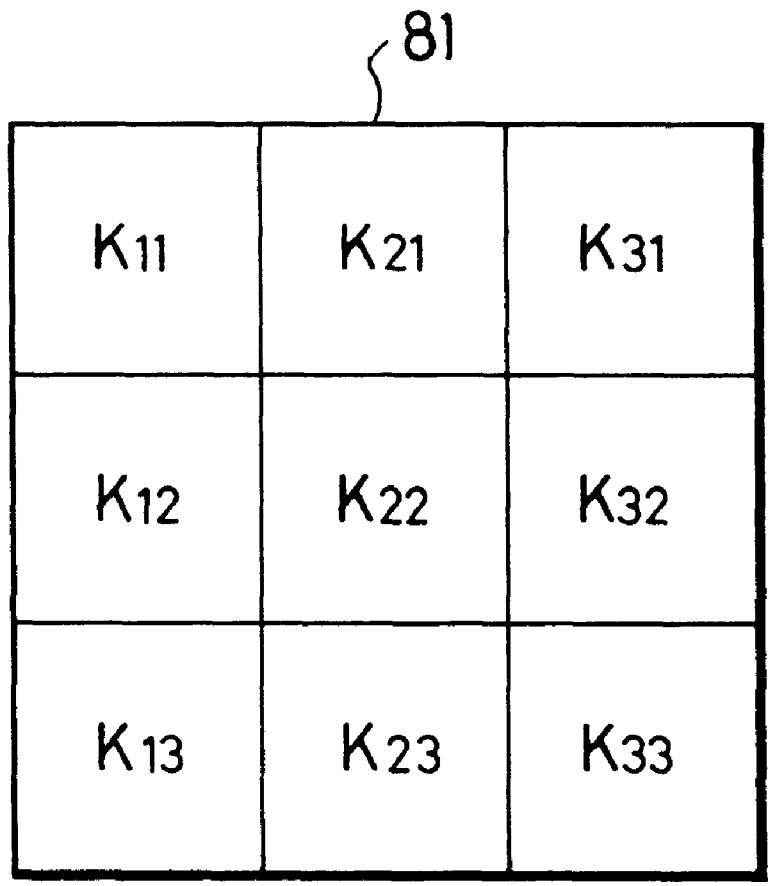
FIG. 25 is a diagram illustrating a filter matrix employed in the seventh embodiment.
Figure 26A:
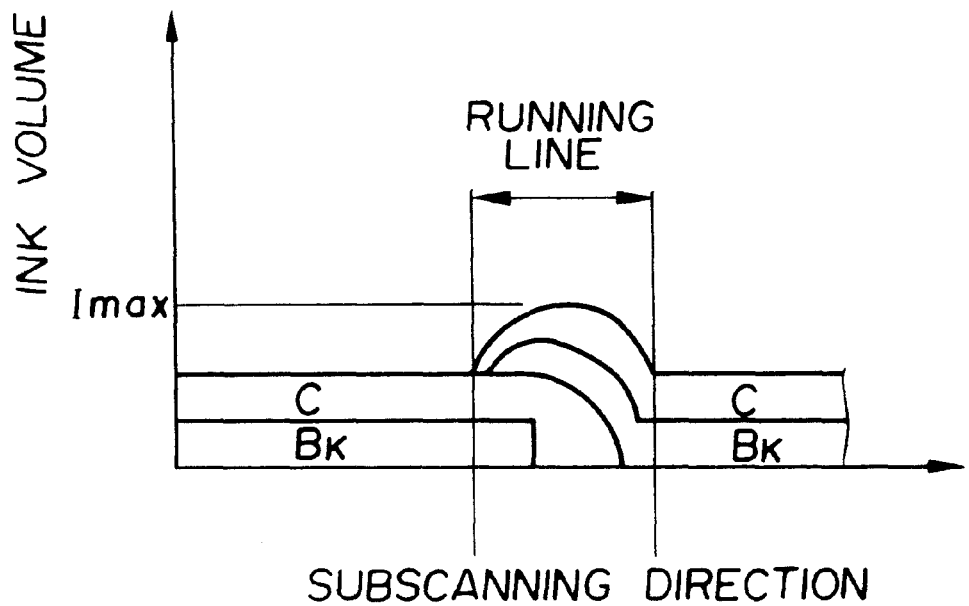
FIGS. 26A and 26B are schematic cross sectional views illustrating the changes in recorded ink volumes and block lines at a scanning boundary in a conventional example and in a seventh embodiment, respectively.
Figure 26B:
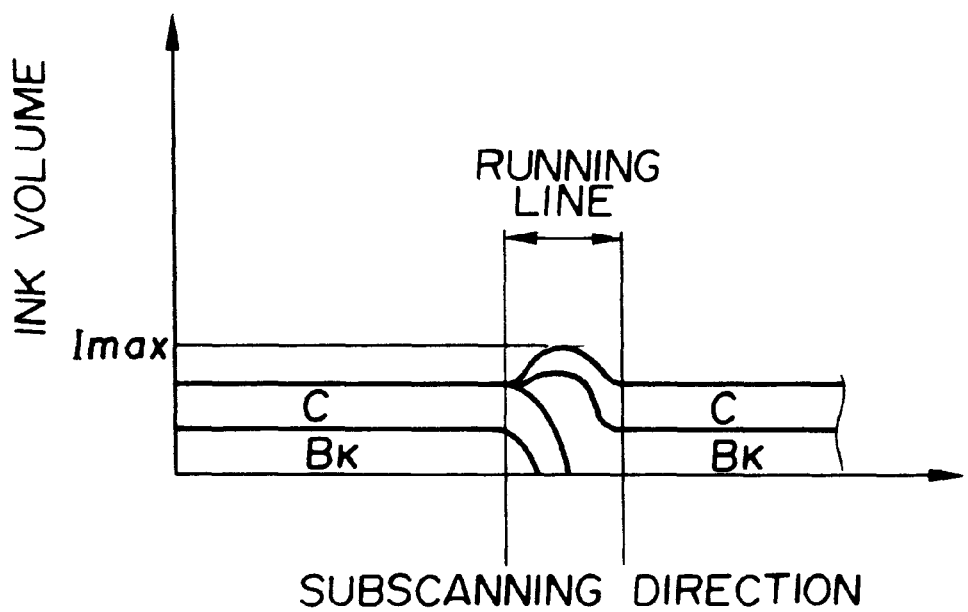

In addition, to take into account the influence of the neighboring pixels on a control signal, a weighted summation is performed on the control pixel and its neighboring pixels, which constitute a filter matrix 81 as shown in FIG. 25. Here, the total input image signal Sbt and the black input image signal Sbbk before the correction are those of the control pixel. In this embodiment, the 3.times.3 filter matrix 81 as shown in FIG. 25 is used, and the total input image signal Sbt at the control pixel k22 is calculated as the arithmetic mean k22a of the values of the image signal Sb associated with all the pixels of the filter matrix 81. ##EQU1## FIGS. 26A and 26B are schematic cross sectional views illustrating the changes in recorded ink volumes and black lines at a scanning boundary in a conventional example and in this embodiment, respectively. Accordingly to this embodiment, the total ink volume Imax can be reduced at the boundary, thereby restricting the ink running at the boundaries and reducing the occurrence of black lines.

Embodiment 8

Figure 27A:
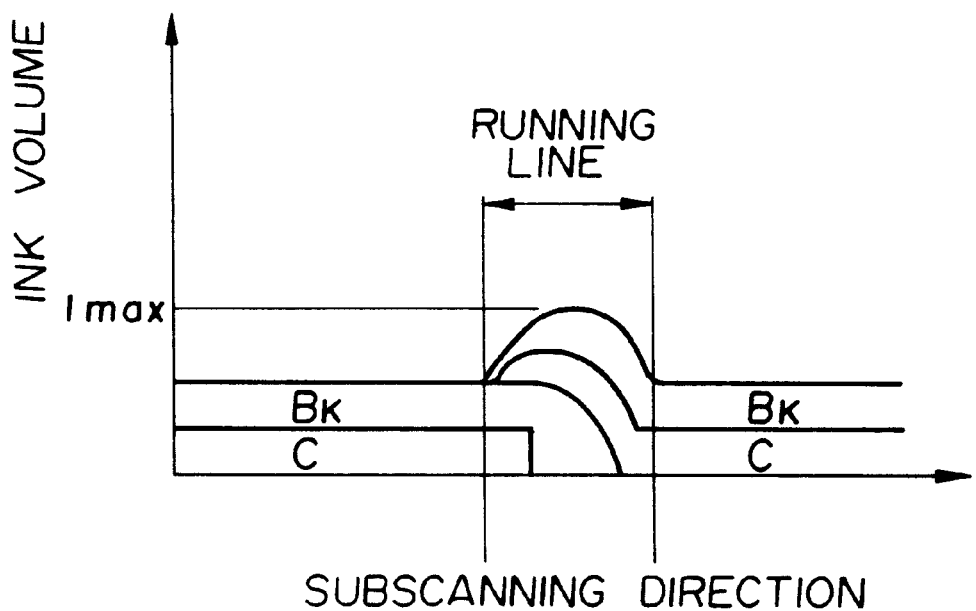
FIGS. 27A and 27B are schematic cross sectional views illustrating the changes in recorded ink volumes and black lines at a scanning boundary in a conventional example and in an eighth embodiment, respectively.
Figure 27B:
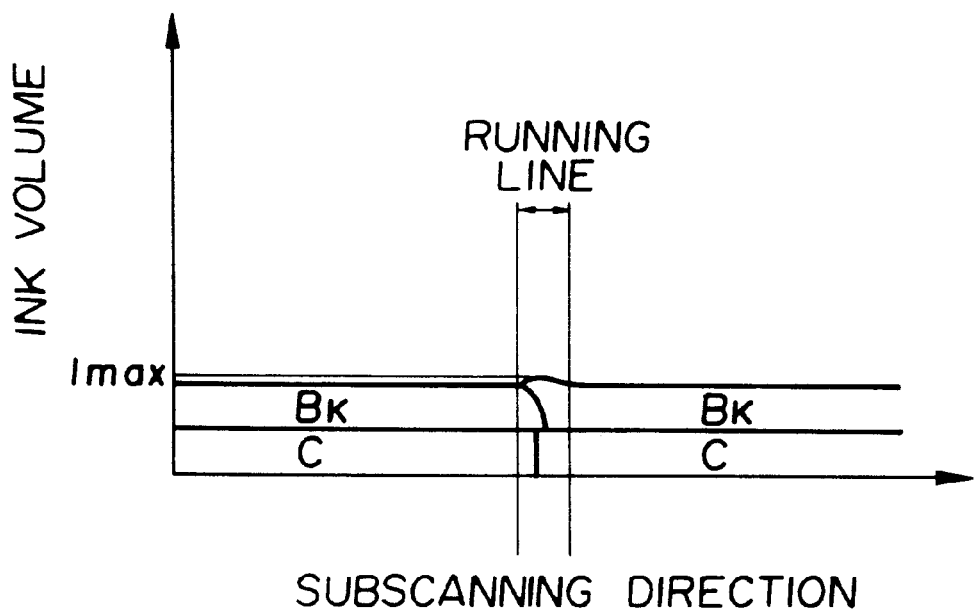

In this embodiment, the full color recording is performed by sequentially recording the cyan, magenta, yellow and black inks in this order. As a result, the advantage of the present invention is confirmed more distinctly. Since the black ink is recorded last in this embodiment, the black ink spreads more in this embodiment than in the seventh embodiment where the black ink is recorded first. FIGS. 27A and 27B are schematic cross sectional views illustrating the changes in recorded ink volumes and black lines at a scanning boundary in a conventional example and in this embodiment, respectively. As shown in this figure, the black ink placed on other inks will cause the saturation of ink on a recording medium, thus forming a larger spread. For this reason, the control of the black ink will produce a greater effect in this embodiment than in the seventh embodiment. In addition, it is confirmed this embodiment has a greater visual effect on the reduction of running lines because the black ink is the last color to be recorded.

Embodiment 9

Figure 28:
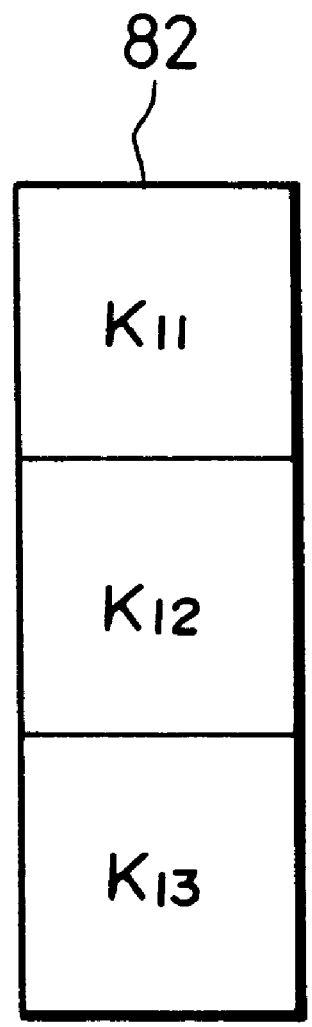
FIG. 28 is a diagram illustrating a filter matrix used in a ninth embodiment.

A filter matrix is not restricted to a two-dimensional arrangement as shown in FIG. 25 (3.times.3 in FIG. 25). For example, it may have one-dimensional arrangement as shown in FIG. 28. With this arrangement, a part of the memory (portions associated with the pixels k11, k12, k13, k31, k32 and k33 in FIG. 25) can be omitted, thereby simplifying the arrangement and reducing the cost. According to this embodiment, an image with few problems can be obtained.

When a one-dimensional filter matrix 82 as shown in FIG. 28 is used, the total input image signal Sbt at the control pixel k12 is calculated as the arithmetic mean k12a of the values of the image signal Sb associated with all the pixels of the filter matrix 82. ##EQU2## The recording is performed at 400 dpi with 2.5 kHz driving frequency.

Embodiment 10

The difference of ink absorption ratios of various recording media can be compensated for by obtaining the total input image signal Sbt by performing a weighted summation on the values C, M, Y and BK of cyan, magenta, yellow and black signals in accordance with the types of the recording media.

For example, the value T of the total input image signal Sbt is calculated by the following equation.

$$T = aC + bM + cY + dBK \quad (3)$$

where the coefficients a, b, c and d are set independently.

It is confirmed experimentally that the running correction can be achieved using the linear functions as shown in FIG. 24, and setting the coefficients as follows for coated paper, for ink jet recording used in the embodiments 7–9, and for BPF (back print film), respectively.

a=1, b=1, c=1, and d=1, for coated paper; and
a=1, b=1, c=1, and d=0, for BPF.

Embodiment 11

Figure 29:
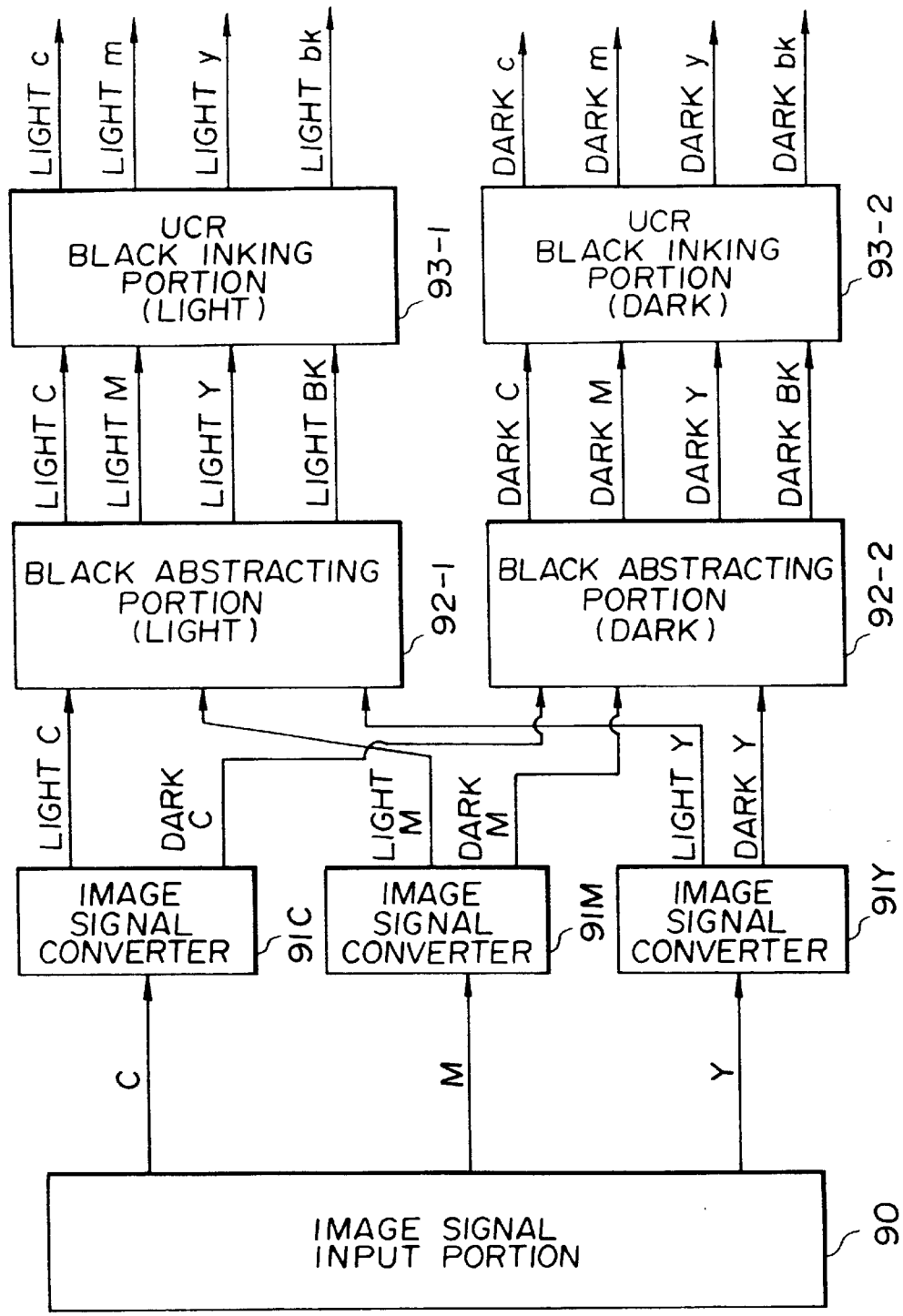
FIG. 29 is a block diagram showing the arrangement of an eleventh embodiment of an image processing apparatus acting to the present invention.

FIG. 29 is a block diagram showing the arrangement of an eleventh embodiment of a color image processing apparatus according to the present invention. In this embodiment, a color image recording apparatus is described which receives three image signals corresponding to cyan, magenta and yellow, and outputs eight image signals corresponding to eight inks of dark black, light black, dark cyan, light cyan, dark magenta, light magenta, dark yellow and light yellow.

In FIG. 29, reference numeral 90 designates an image signal input portion which receives and outputs three image signals C (cyan), M (magenta) and Y (yellow). The image signals C, M and Y are supplied to image signals converters 91C, 91M and 91Y, respectively. The image signal converter 91C separates the image signal C into dark and light signals corresponding to dark cyan ink and light cyan ink. Likewise, the image signal converters 91M and 91Y split the image signals M and Y into dark and light signals, respectively. The light signals associated with the three colors C, M and Y are inputted to a black abstracting portion 92-1 which abstracts a light black signal from the light signals, whereas the dark signals associated with the three colors C, M and Y are inputted to a black abstracting portion 92-2 which abstracts a dark black signal from the dark signals. The light signals corresponding to C, M, Y and BK are inputted to a UCR and black inking portion 93-1 which performs a UCR processing and an inking processing on the light image signals, and the dark signals corresponding to C, M, Y and BK are inputted to a UCR and black inking portion 93-2 which performs a UCR processing and an inking processing on the dark image signals.

Figure 6:
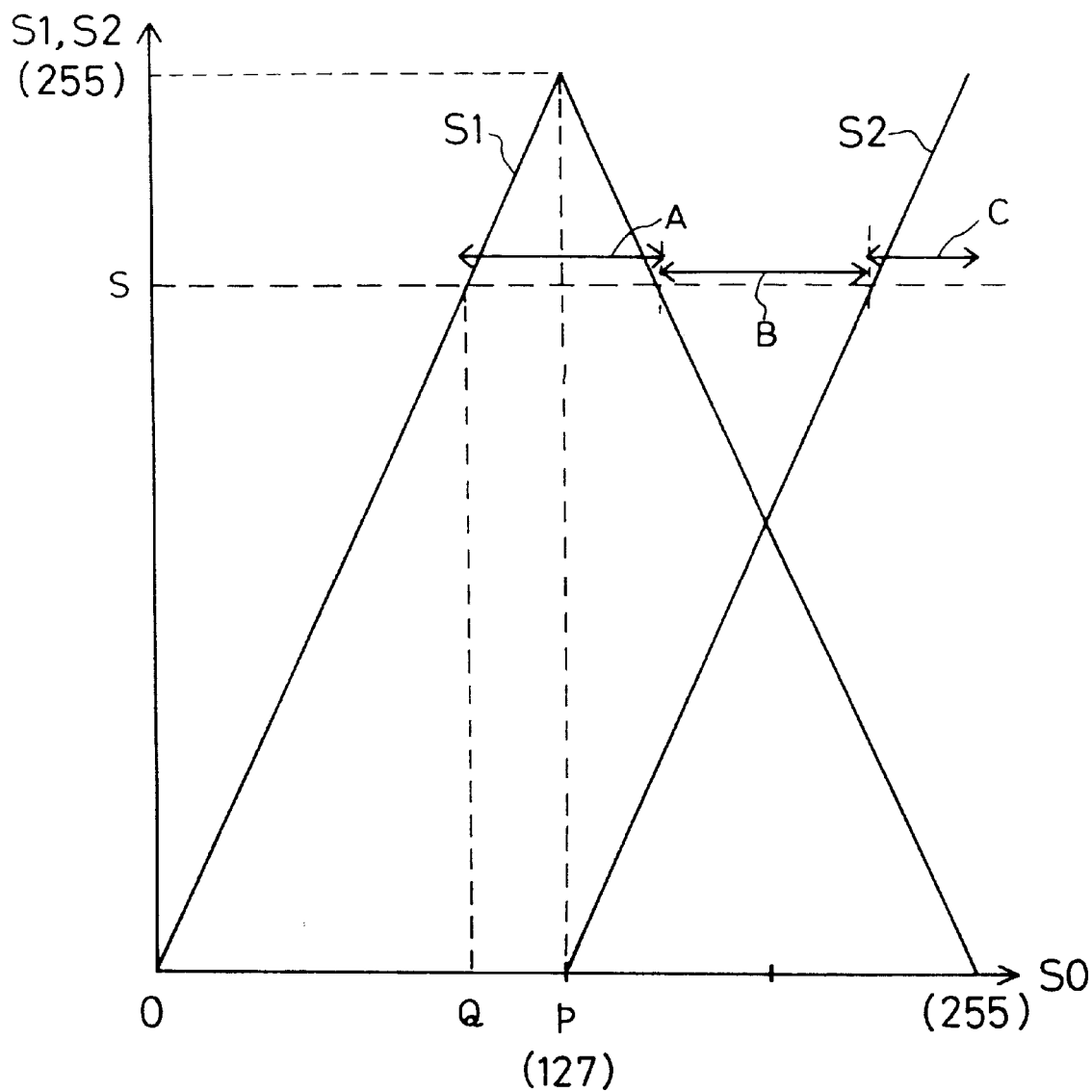
FIG. 6 is a diagram illustrating the characteristics of a conventional dark/light separation table.
Figure 7:
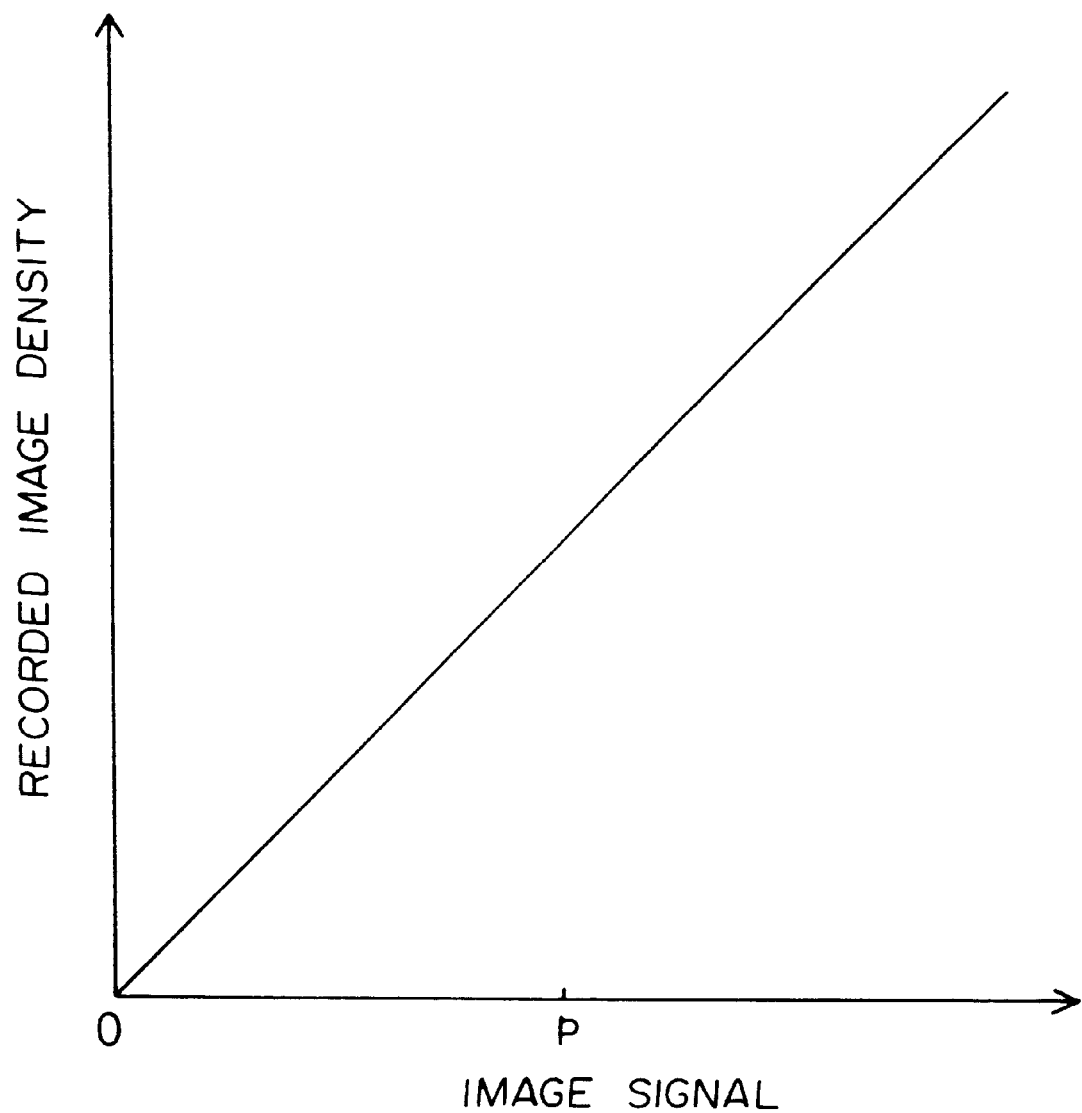
FIG. 7 is a diagram illustrating the relationship between an image signal and recorded image densities.

The operation of the embodiment will now be described. The image signals C, M and Y outputted from the image signal input portion 90 are first converted into six image signals of light C, dark C, light M, dark M, light Y and dark Y by the image signal converters 91C, 91M and 91Y using dark/light separating tables whose characteristics are shown in FIG. 6. Subsequently, the black abstracting portions 92-1 and 92-2 generate image signals of light BK and dark BK in accordance with the following equations (4) and (5).

$$\text{light BK} = \min(\text{light C, light M, light Y}) \quad (4)$$

$$\text{dark BK} = \min(\text{dark C, dark M, dark Y}) \quad (5)$$

These equations mean that the minimum values of the image signals C, M and Y, that is, the most low intensity signals (which correspond to parts common to the three image signals C, M and Y) are selected from each of the dark and light signals, and are made black signals. The UCR and black inking portions 93-1 and 93-2 perform the UCR processing and black inking processing in accordance with the following equations (6)–(13), and output eight image signals of light c, light m, light y and light bk, and dark c, dark m, dark y and dark bk.

$$\text{light c} = \text{light C} - ac.\text{times.light BK} \quad (6)$$

$$\text{light m} = \text{light M} - aM.\text{times.light BK} \quad (7)$$

$$\text{light y} = \text{light Y} - aY.\text{times.light BK} \quad (8)$$

$$\text{dark c} = \text{dark C} - bc.\text{times.dark BK} \quad (9)$$

$$\text{dark } m = \text{dark } M - bM \times \text{dark } BK \tag{10}$$

$$\text{dark } y = \text{dark } Y - bY \times \text{dark } BK \tag{11}$$

$$\text{light } bk = aBK \times \text{light } BK \tag{12}$$

$$\text{dark } bk = bBK \times \text{dark } BK \tag{13}$$

where aC, aM, aY, aBK, bC, bM, bY and bBK are coefficients, and take values of 0.5, for example.

The eight image signals are converted into a binary representation, and are recorded on paper using a color ink jet printer. It was experimentally confirmed that a high quality image could be obtained without the overflow of ink.

In a conventional apparatus, the total volume of recorded ink is controlled in accordance with the image signals, C, M and Y before the separation, which are correspond to the signal S0 in FIG. 6. On the other hand, in this embodiment, the total volume of recorded ink is controlled through the black abstracting processing, UCR processing and black inking processing performed independently on the light image signals C, M and Y, and the dark image signals C, M and Y, which have been separated beforehand.

For example, let us compare the present invention with a conventional recording exemplifying a recording of the most dark image. In this case, it is assumed that the values of C, M and Y signals before the separation are 255, that they are reduced from 255 to 128 by the UCR and inking processings, and the value of a BK signal is increased from 0 to 127.

Figure 10:
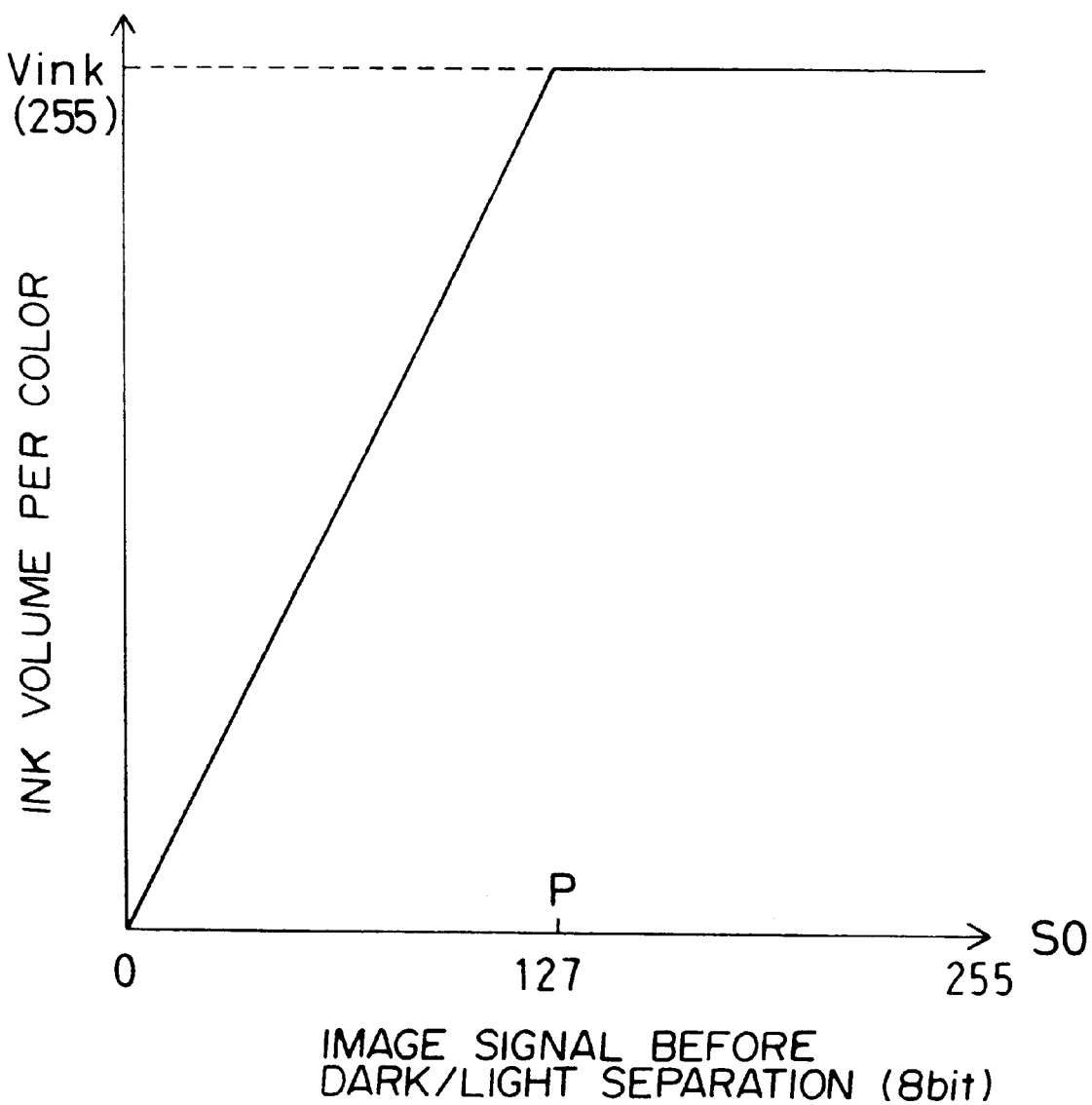
FIG. 10 is a diagram illustrating the relationship between the image signal S0 before the dark/light separation and the recorded ink volume per color in the conventional ink jet recording apparatus as shown in FIG. 4.

In the conventional recording, the UCR and inking processings are performed before the separation. Accordingly, the discharge volumes of dark and light inks associated with C, M and Y signals are set at Vink (=255) as shown in FIG. 10, and the discharge volume of black ink associated with the BK signal also increases from 0 to Vink. As a result, the total ink volume becomes 4 Vink.

In contrast with this, this embodiment performs the UCR and inking processings after the separation. In this case, all the light image signals fall zero as shown in FIG. 6, and the values of dark C, M and y signals take a value of 255. By performing the processings as shown by equations (6)–(13), the discharge volumes of light C, M and Y ink falls to zero, whereas those of the dark ink becomes 128, or Vink/2. Further, the discharge volume of the dark BK ink becomes 127 or Vink/2. Thus, the total discharge ink volume reduces to 2 Vink, or half that of the conventional example.

As a result, the total volume of recorded ink can be positively reduced, thereby preventing the overflow of ink. This makes it possible to achieve a high quality image.

Embodiment 12

In the eleventh embodiment, eight image signals corresponding to eight color inks are produced to form color images. In practice, however, the yellow is inconspicuous, and the yellow dots are seldom noticeable even in highlighted portions. Generally, since the number of recording heads agrees with the number of inks, the manufacturing cost of an image recording apparatus becomes cheaper as the number of inks decreases. Thus, the cost of a color image recording apparatus can be reduced by outputting a y signal in place of the light and dark y signals. A twelfth embodiment of the present invention relates to such an apparatus.

Figure 30:
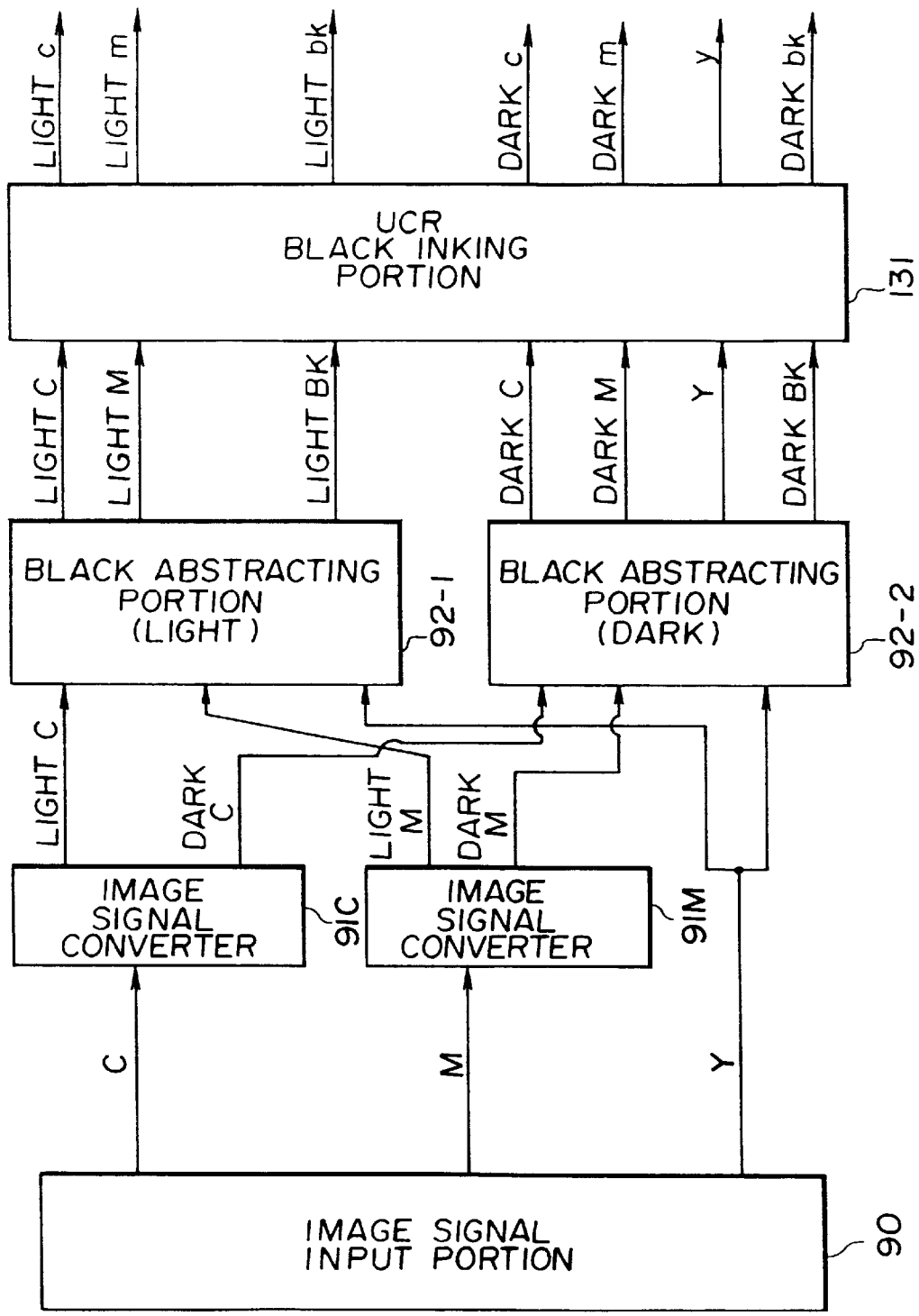
FIG. 30 is a block diagram showing the arrangement of a twelfth embodiment of an image processing apparatus according to the present invention.

FIG. 30 shows a major portion of the twelfth embodiment of the present invention. The system of FIG. 30 differs from that of FIG. 29 in the following aspects.

(1) The image signal converter 91Y for separating the yellow image signal Y into the light and dark signals is not provided so that the yellow image signal Y is directly inputted to both black abstracting portions 92-1 and 92-2.

(2) The black abstracting portion 92-1 does not output the light Y, and the black abstracting portion 92-2 outputs the Y signal.

(3) The UCR and black inking portions 93-1 and 93-2 of FIG. 29 are replaced by a UCR and black inking portion 131 having a similar processing function, the portion 131 outputs a y signal instead of the light y and dark y signals. The signal y will be described in more detail later.

The seven output image signals of light c, light m, light bk, dark c, dark m, dark bk and y are converted into the binary representation. Then, the total of seven inks consisting of the four inks of the dark cyan, dark magenta, dark black and yellow, and the three inks of the light cyan, light magenta and light black, whose concentration is about half that of the dark ones are inputted to seven recording heads so that color images are formed on a recording medium by recording the seven inks.

In the arrangement described above, the image signals C and M outputted from the image signal input portion 90 are converted into four image signals of light C, dark C, light M and dark M by the image signal converters 91C and 91M as in the eleventh embodiment, and the converted signals are sent to the (22) corresponding black abstracting portions 92-1 and 92-2, respectively. The image signal Y, on the other hand, is directly sent to the black abstracting portions 92-1 and 92-2. The black abstracting portions 92-1 and 92-2 perform black abstraction on the image signals in accordance with the following equations (14) and (15), and form the seven image signals of light C, light M, light BK, dark C, dark M, dark BK and Y, which are sent to the UCR and black inking portion 131.

$$\text{light } BK = 2 \times \min(\text{light } C/2, \text{light } M/2, Y) \tag{14}$$

$$\text{dark } BK = \min(\text{dark } C, \text{dark } M, Y) \tag{15}$$

The UCR and black inking portion 131 performs the UCR processing and black inking processing on the seven image signals of light C, light M, light BK, dark C, dark M, dark BK and Y by applying the following equations (16)–(22), and produces the seven image signals of light c, light m, light bk, dark c, dark m, dark bk and y.

$$\text{light } c = \text{light } C - dc \times \text{light } BK \tag{16}$$

$$\text{light } m = \text{light } M - dM \times \text{light } BK \tag{17}$$

$$\text{dark } c = \text{dark } C - ec \times \text{dark } BK \tag{18}$$

$$\text{dark } m = \text{dark } M - eM \times \text{dark } BK \tag{19}$$

$$\text{light } bk = dBK \times \text{light } BK \tag{20}$$

$$\text{dark } bk = eBK \times \text{dark } BK \tag{21}$$

$$y = Y - dY \times \text{light } BK/2 - eY \times \text{dark } BK \tag{22}$$

where dc, C1M, dY, dBK, eC, eM, eY and eBK are coefficients, taking values 0.5, for example.

Figure 4:
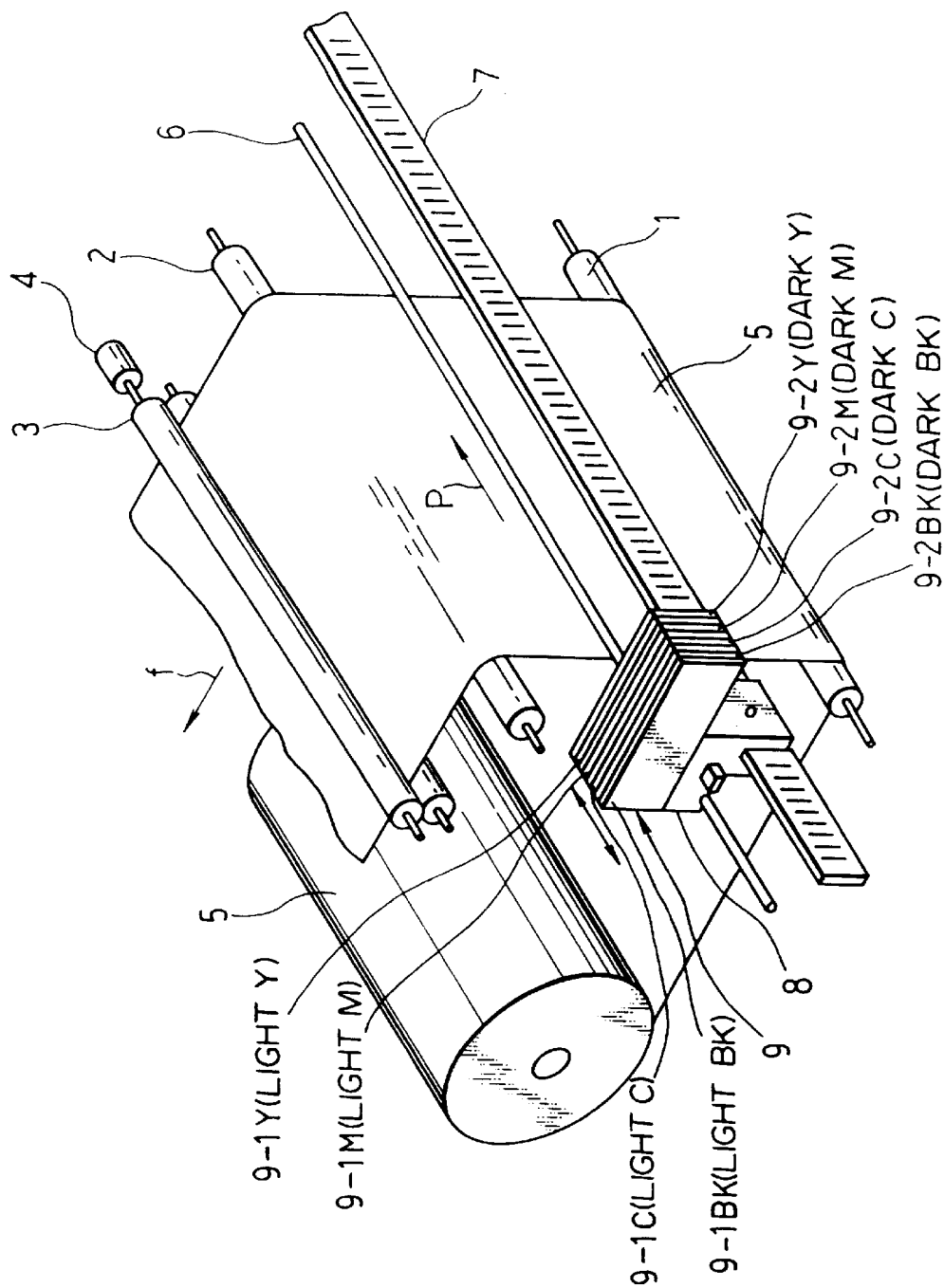
FIG. 4 is a schematic perspective view showing an example of a color image recording apparatus.
Figure 5:
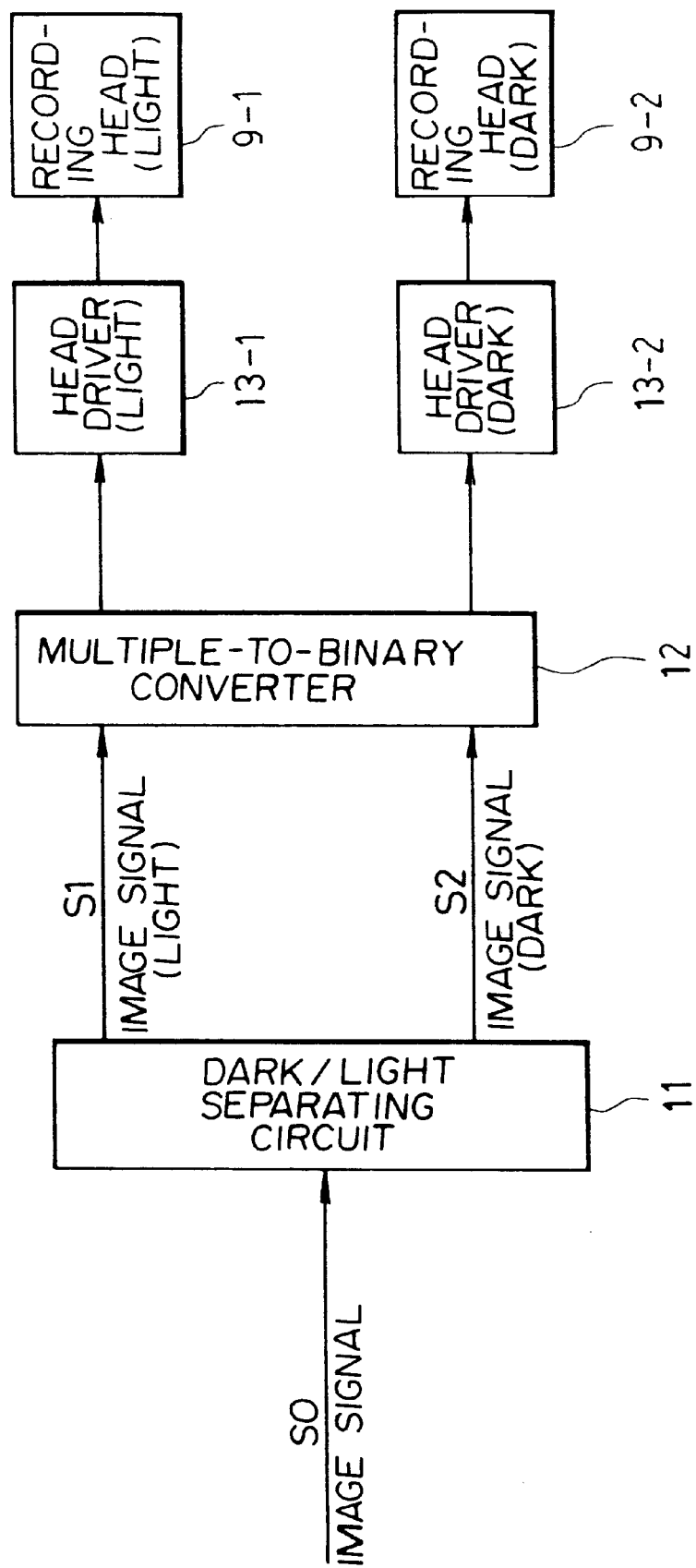
FIG. 5 is a block diagram showing an arrangement of the signal processing system of the conventional color image recording apparatus.

The seven image signals outputted from the UCR and black inking portion 131 are converted into a binary representation, and are recorded using the color image recording apparatus as shown in FIG. 4. According to this embodiment, high quality images were obtained without the overflow of ink.

Embodiment 13

Figure 31:
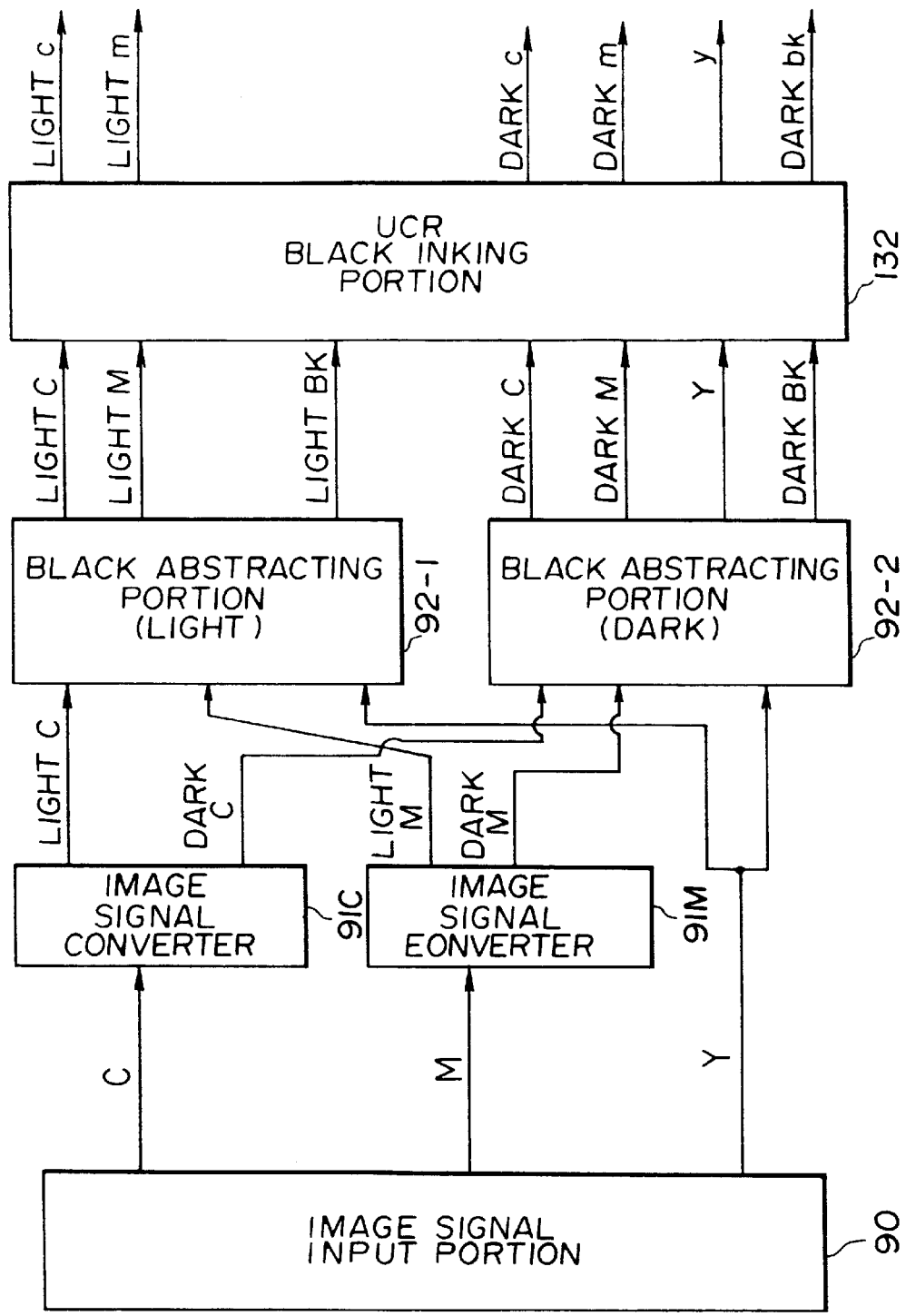
FIG. 31 is a block diagram showing the arrangement of a thirteenth embodiment of an image processing apparatus according to the present invention.

FIG. 31 shows an arrangement of a thirteenth embodiment in accordance with the present invention. In FIG. 31, the same reference numerals denote like portions in FIGS. 29 and 30. The object of this embodiment is to provide a more inexpensive apparatus than the twelfth embodiment. The color image processing apparatus outputs six image signals corresponding to six color inks of light cyan, dark cyan, light magenta, dark magenta, yellow and black. Among these inks, the four inks of the dark cyan, dark magenta, yellow and black have about the same concentration, and the remaining inks of light cyan and light magenta are of about half the concentration of the former inks.

In FIG. 31, the processing as far as the black abstracting process is the same as that of the twelfth embodiment. This embodiment differs from the twelfth embodiment in the black inking process. The UCR and black inking portion 132 performs the black inking in accordance with the following equations (23)–(28), and outputs the six image signals of light cyan, light magenta, dark cyan, dark magenta, yellow and black.

$$\text{light } c = \text{light } C - dc \times \text{light } BK \quad (23)$$

$$\text{light } m = \text{light } M - dM \times \text{light } BK \quad (24)$$

$$\text{dark } c = \text{dark } C - ec \times \text{dark } BK \quad (25)$$

$$\text{dark } m = \text{dark } M - eM \times \text{dark } BK \quad (26)$$

$$y = Y - dY \times \text{light } BK/2 - eY \times \text{dark } BK \quad (27)$$

$$bk = fBK \times \text{light } BK/2 + gBK \times \text{dark } BK \quad (28)$$

where dc, dM, dY, ec, eM, eY, fBK and gBK are coefficients taking values 0.5, for example. Here, equations (23)–(26) are identical to equations (16)–(19), and equation (27) is identical to equation (22).

The six image signals outputted from the UCR and black inking portion 132 are converted into a binary representation, and are recorded using the color image recording apparatus as shown in FIG. 4. According to this embodiment, high quality images were obtained without the overflow of ink.

Although the number of colors for each color family after the separation is two associated with light and dark inks in the embodiments 11–13, the present invention can also be applied to three or more colors for each color family. Furthermore, the image signals outputted from the image signal input portion are sufficient only if they include at least three image signals corresponding to cyan, magenta and yellow, and hence, the present invention can also be applied to the image signals including those corresponding to four or more colors.

(Supplement)

The present invention achieves its distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy to be generated corresponding to recording information; second, the thermal energy induces a sudden temperature rise that exceeds the nucleate boiling so as to cause the film boiling on heating portions of the recording head; and third, bubbles grow in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: This structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than room temperature and are softened or liquefied at room temperature. This is because in the ink jet system, the ink is generally temperature adjusted in a range of 30.degree. C.–70.degree. C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Although specific embodiments of an image recording apparatus constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An image recording apparatus which performs image recording by using a recording head including a plurality of nozzles discharging ink, said apparatus comprising:

scanning means for scanning said recording head;

driving means for driving said recording head to perform recording on a recording medium while said scanning means scans said recording head, said driving means performing the recording by discharging the ink in accordance with driving signals derived from an input image signal and corresponding to respective ones of said plurality of nozzles;

correction means for correcting the image signal so as to adjust a volume of the ink to be discharged to the recording medium through a nozzle among said plurality of nozzles in said recording head in accordance with an image density represented by the input image signal, said nozzle corresponding to an edge of a region recorded by said scanning means, said correction means for making correction in accordance with not only an image signal corresponding to a nozzle corresponding to an edge of a region recorded by said scanning means, but also an image signal corresponding to neighboring nozzles near said nozzle; and means for generating image signals which correspond to respective ones of a plurality of inks having different concentrations belonging to the same color family based upon the image signal corrected by said correction means.

2. An image recording apparatus as claimed in claim 1, wherein said correction means comprises means for generating a corrected input image signal by calculating weighted summation of the input image signal associated with pixels in a matrix consisting of said pixel corresponding to the edge of the region recorded by the scanning of said scanning means and its neighboring pixels, and correcting means for correcting volumes of ink to be adhered to each of said edge pixels in accordance with the corrected input image signal.

3. An image recording apparatus as claimed in claim 2, wherein said correcting means varies coefficients of the weighted summation in accordance with a type of said recording medium.

4. An image recording apparatus as claimed in claim 2, wherein said matrix is a one dimensional matrix arranged in the direction of a nozzle array of said recording head.

5. An image recording apparatus as claimed in claim 1, wherein said apparatus comprises recording heads for black, cyan, magenta, yellow and black inks.

6. An image recording apparatus as claimed in claim 5, wherein said control means generates the signal supplied to said head driving means in such a manner that the signal associated with the black ink is outputted second or later in order in the plurality of color inks.

7. An image recording apparatus as claimed in claim 1, wherein said correction means corrects an image signal corresponding to a predetermined number of a nozzle or nozzles disposed at an edge of a nozzle array consisting of said plurality of nozzles in said recording head.

8. An image recording apparatus as claimed in claim 1, wherein said recording head comprises a thermal energy generating means for discharging ink.

9. An image recording apparatus as claimed in claim 8, wherein the ink is discharged through said nozzles in said recording head in a manner such that thermal energy is supplied from said thermal energy generating means to the ink to produce bubbles in the ink so that the ink is discharged through said nozzles by pressure of the bubbles.

10. An image recording method using recording head having a nozzle array consisting of a plurality of nozzles for discharging ink, for performing recording on a recording medium while scanning said recording head in a main scanning direction, said method comprising the steps of:

inputting image signals which correspond to said plurality of nozzles, respectively in said recording head;

performing a correction process for correcting an image signal which corresponds to a predetermined number of a nozzle or nozzles disposed at an edge of said nozzle array so as to adjust a volume of the ink to be discharged to the recording medium is reduced, said correction process for making correction in accordance with not only an image density represented by an image signal corresponding to a nozzle corresponding to an edge of a region recorded by said scanning means, but also an image signal corresponding to neighboring nozzles near said nozzle;

generating image signals which correspond to respective ones of a plurality of inks having different concentrations belonging to the same color family based upon the image signal corrected by said correction process; and performing recording on the recording medium by driving said recording head while scanning said recording head so as to discharge the ink in accordance with the driving signals corresponding to said plurality of nozzles, respectively, the driving signals being derived based upon the corrected image signals.

11. An image recording method as claimed in claim 10, wherein in the correction step comprises a step for generating a corrected input image signal by calculating weighted summation of the input image signal associated with pixels in a matrix consisting of said pixel corresponding to the edge of the region recorded by the scanning and its neighboring pixels, and correcting volumes of ink to be adhered to each of said edge pixels in accordance with the corrected input image signal.

12. An image recording method as claimed in claim 10, wherein said correction step corrects an image signal corresponding to a predetermined number of a nozzle or nozzles disposed at an edge of a nozzle array consisting of said plurality of nozzles in said recording head.

13. An image recording method as claimed in claim 10, wherein in said recording step causes a thermal energy generating means for discharging ink.

14. An image recording method as claimed in claim 13, wherein the ink is discharged through said nozzles in said recording head in a manner such that thermal energy is supplied from said thermal energy generating means to the ink to produce bubbles in the ink so that the ink is discharged through said nozzles by pressure of the bubbles.

* * * * *

UNITED STATES PATENT AND TRADEMARK OFFICE
CERTIFICATE OF CORRECTION

PATENT NO. : 6,234,600 B1
DATED : May 22, 2001
INVENTOR(S) : Tishimitsu Danzuka et al.

It is certified that error appears in the above-identified patent and that said Letters Patent is hereby corrected as shown below:

Title page,
Item [57] ABSTRACT,
Line 2, "bound-" should read -- scanning bound- --;
Line 8, "ink, and" should read -- ink. The apparatus --; and
Line 19, "are" should be deleted.

Drawings, Sheet 31,
Figure 31, "EONVERTER" should read -- CONVERTER --.

Column 3,
Line 24, "fur" should read -- four --.

Column 7,
Line 1, "produced" should read -- produce --; and
Line 54, "prevent" should read -- present --.

Column 8,
Line 4, "diagram" should read -- diagrams --.

Column 10,
Line 5, "a)" should read -- (a) --.

Column 11,
Line 39, "net" should read -- not --.

Column 12,
Line 46, "45.degree.C.," should read -- 45 degrees C, --.

Column 13,
Line 35, "(45.degree.C.," should read -- (45 degrees C, --; and
Line 42, "(45.degree.C.," should read -- (45 degrees C, --.

Column 14,
Line 53, "one" should be deleted; and
Line 54, "nozzles" should read -- nozzle --.

UNITED STATES PATENT AND TRADEMARK OFFICE
CERTIFICATE OF CORRECTION

PATENT NO. : 6,234,600 B1
DATED : May 22, 2001
INVENTOR(S) : Tishimitsu Danzuka et al.

It is certified that error appears in the above-identified patent and that said Letters Patent is hereby corrected as shown below:

Column 17,
Line 15, "are" should be deleted;
Line 39, "y" should read -- Y --; and
Line 41, "falls" should read -- fall --.

Column 21,
Line 11, "30.degree.C. - 70.degree.C" should read -- 30 degrees C - 70 degrees C --.

Signed and Sealed this

Fifteenth Day of January, 2002

Attest:

Attesting Officer

JAMES E. ROGAN
*Director of the United States Patent and Trademark Office*